US012593142B2

(12) United States Patent
Liang et al.

(10) Patent No.: US 12,593,142 B2
(45) Date of Patent: Mar. 31, 2026

(54) DIFFRACTION-GATED REAL-TIME ULTRA-HIGH-SPEED MAPPING PHOTOGRAPHY SYSTEM AND METHOD

(71) Applicant: INSTITUT NATIONAL DE LA RECHERCHE SCIENTIFIQUE, Québec (CA)

(72) Inventors: Jinyang Liang, Boucherville (CA); Xianglei Liu, Longueuil (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 60 days.

(21) Appl. No.: 18/679,921

(22) Filed: May 31, 2024

(65) Prior Publication Data
US 2024/0406584 A1 Dec. 5, 2024

Related U.S. Application Data

(60) Provisional application No. 63/505,472, filed on Jun. 1, 2023.

(51) Int. Cl.
*H04N 23/959* (2023.01)
*H04N 23/957* (2023.01)

(52) U.S. Cl.
CPC ......... *H04N 23/959* (2023.01); *H04N 23/957* (2023.01)

(58) Field of Classification Search
CPC .... H04N 23/959; H04N 23/957; H04N 23/95; H04N 23/815; H04N 19/593; G03B 39/00; G03B 35/00
See application file for complete search history.

(56) References Cited

U.S. PATENT DOCUMENTS

| | | | | |
|---|---|---|---|---|
| 10,992,924 | B2 * | 4/2021 | Wang | G03B 35/00 |
| 12,244,952 | B2 * | 3/2025 | Liang | G03B 39/00 |
| 2019/0041524 | A1 | 2/2019 | Korsgaard Jensen et al. | |
| 2019/0216332 | A1 * | 7/2019 | Zalev | A61B 8/52 |
| 2020/0200877 | A1 | 6/2020 | Yoo et al. | |
| 2021/0088384 | A1 * | 3/2021 | Wang | H04N 19/593 |
| 2021/0136319 | A1 * | 5/2021 | Zhang | H04N 23/815 |

(Continued)

FOREIGN PATENT DOCUMENTS

WO 2020/077064 4/2020

OTHER PUBLICATIONS

Abou-Elkacem, L., S.V. Bachawal, and J.K. Willmann, Ultrasound molecular imaging: Moving toward clinical translation. Eur. J. Radiol., 2015. 84(9): p. 1685-1693.

(Continued)

*Primary Examiner* — Hung H Lam
(74) *Attorney, Agent, or Firm* — Gwendoline Bruneau; Lavery, de Billy, L.L.P.

(57) ABSTRACT

A diffraction-gated real-time ultrahigh-speed mapping photography method and system, by probing a transient scene with a single-wavelength continuous-wave beam, imaging the probed transient scene, generating different replicated images of the transient scene at spatially separated positions by using a 4f imaging system and a spatial light modulator, and rescaling the images size onto a low-speed CMOS or CCD camera for example, synchronizing with the flipping of the spatial light modulator for recording images of the transient scene.

20 Claims, 18 Drawing Sheets

(56) References Cited

U.S. PATENT DOCUMENTS

2023/0125131 A1* 4/2023 Gao .................. H04N 23/957
                                                    349/15
2023/0283917 A1* 9/2023 Liang .................. H04N 23/95
                                                    348/222.1

OTHER PUBLICATIONS

Akhmanov, S.A., V.A. Vysloukh, and A.S. Chirkin, Self-action of wave packets in a nonlinear medium and femtosecond laser pulse generation. Sov. phys., Usp., 1986. 29(7): p. 642.

Baum, P. and A.H. Zewail, Breaking resolution limits in ultrafast electron diffraction and microscopy. PNAS, 2006. 103 (44): p. 16105-16110.

Benton, D.M., Temporal and spectral dispersion of an optical source using a micromirror array-based streak camera. Optical Engineering, 2022. 61(11): p. 114108.

Chan, S.H., X. Wang, and O.A. Elgendy, Plug-and-play ADMM for image restoration: Fixed-point convergence and applications. IEEE Trans. Comput. Imaging, 2016. 3(1): p. 84-98.

Chin, C.T., et al., Brandaris 128: A digital 25 million frames per second camera with 128 highly sensitive frames. Rev. Sci. Instrum., 2003. 74(12): p. 5026-5034.

Cohen, J., et al., Measuring temporally complex ultrashort pulses using multiple-delay crossed-beam spectral interferometry. Opt. Express, 2010. 18(7): p. 6583-6597.

Dresselhaus-Cooper, L., et al., Single-shot multi-frame imaging of cylindrical shock waves in a multi-layered assembly. Sci. Rep., 2019. 9(1): p. 1-12.

Dudley, D., W.M. Duncan, and J. Slaughter. Emerging digital micromirror device (DMD) applications. in MOEMS display and imaging systems. 2003. SPIE.

Fujita, H., et al., Initiation process and propagation mechanism of positive streamer discharge in water. J. Appl. Phys., 2014. 116(21): p. 213301.

Gao, L., et al., Single-shot compressed ultrafast photography at one hundred billion frames per second. Nature, 2014. 516(7529): p. 74-77.

Gao, G., et al., Ultrafast all-optical solid-state framing camera with picosecond temporal resolution. Opt. Express, 2017. 25(8): p. 8721-8729.

Goodman, J.W. and P. Sutton, Introduction to Fourier optics. J. opt., B Quantum semiclass. opt., 1996. 8(5): p. 1095.

Hebling, J., et al., Velocity matching by pulse front tilting for large-area THz-pulse generation. Opt. Express, 2002. 10 (21): p. 1161-1166.

Helfield, B., et al., Fluid viscosity affects the fragmentation and inertial cavitation threshold of lipid-encapsulated microbubbles. Ultrasound Med. Biol., 2016. 42(3): p. 782-794.

Helfield, B., Y. Zou, and N. Matsuura, Acoustically-stimulated nanobubbles: opportunities in medical ultrasound imaging and therapy. Front. Phys., 2021. 9: p. 654374.

Hellman, B. and Y. Takashima, Angular and spatial light modulation by single digital micromirror device for multi-image output and nearly-doubled étendue. Optics Express, 2019. 27(15): p. 21477-21496.

Hellman, B., et al., Gigapixel and 1440-perspective extended-angle display by megapixel MEMS-SLM. Optics Letters, 2020. 45(18): p. 5016-5019.

Hellman, B., et al., Single-chip holographic beam steering for lidar by a digital micromirror device with angular and spatial hybrid multiplexing. Optics Express, 2020. 28(15): p. 21993-22011.

Kakue, T., et al., Digital light-in-flight recording by holography by use of a femtosecond pulsed laser. IEEE J Sel Top Quantum Electron, 2011. 18(1): p. 479-485.

Kang, E., et al., All-MEMS Lidar Using Hybrid Optical Architecture with Digital Micromirror Devices and a 2D-MEMS Mirror. Micromachines, 2022. 13(9): p. 1444.

Kolner, B.H., Space-time duality and the theory of temporal imaging. IEEE J. Quantum Electron., 1994. 30(8): p. 1951-1963.

Lai, Y., et al., Single-Shot Ultraviolet Compressed Ultrafast Photography. Laser Photonics Rev., 2020. 14(10): p. 2000122.

Lai, Y., et al., Compressed ultrafast tomographic imaging by passive spatiotemporal projections. Optics letters, 2021. 46(7): p. 1788-1791.

Lazovsky, L., et al. CCD sensor and camera for 100 Mfps burst frame rate image capture. in Airborne Intelligence, Surveillance, Reconnaissance (ISR) Systems and Applications II. 2005. Proceedings of SPIE vol. 5787.

Leighton, T., The Acoustic Bubble. | Academic. Press, London, 1994: p. 129-286.

Liang, J., et al., High-precision laser beam shaping using a binary-amplitude spatial light modulator. Applied optics, 2010. 49(8): p. 1323-1330.

Liang, J., et al., Grayscale laser image formation using a programmable binary mask. Opt. Eng., 2012. 51(10): p. 108201.

Liang, J., et al., Encrypted three-dimensional dynamic imaging using snapshot time-of-flight compressed ultrafast photography. Sci. Rep., 2015. 5: p. 15504.

Liang, J., et al., Single-shot real-time video recording of a photonic Mach cone induced by a scattered light pulse. Sci. Adv. 2017. 3(1): p. e1601814.

Liang, J.Y., L.R. Zhu, and L.H.V. Wang, Single-shot real-time femtosecond imaging of temporal focusing. Light Sci. Appl., 2018. 7(42).

Liang, J.Y. and L. Wang, Single-shot ultrafast optical imaging. Optica, 2018. 5(9): p. 1113-1127.

Liu, X., et al., Single-shot real-time compressed ultrahigh-speed imaging enabled by a snapshot-to-video autoencoder. Photonics Res., 2021. 9(12): p. 2464-2474.

Lopez, D.O., et al. MEMS mirror array for a wavelength-selective 1xK switch. in Smart Sensors, Actuators, and MEMS. 2003. SPIE vol. 5116.

Nakagawa, K., et al., Sequentially timed all-optical mapping photography (STAMP). Nat. Photonics, 2014. 8(9): p. 695-700.

Noack, J., et al., Influence of pulse duration on mechanical effects after laser-induced breakdown in water. Journal of Applied Physics, 1998. 83(12): p. 7488-7495.

Plesset, M.S. The Dynamics of Cavitation Bubbles. 1949, pp. 277-282.

Rodriguez, J., et al., Fast laser beam steering into multiple diffraction orders with a single digital micromirror device for time-of-flight lidar. Applied Optics, 2020. 59(22): p. G239-G248.

Schaffer, C.B., et al., Dynamics of femtosecond laser-induced breakdown in water from femtoseconds to microseconds. Optics Express, 2002. 10(3): p. 196-203.

M. Sheinman, et al., Flatfield ultrafast imaging with single-shot non-synchronous array photography. Opt. Lett., 2022. 47(3): p. 577-580.

Sinibaldi, G., et al., Laser induced cavitation: Plasma generation and breakdown shockwave. Phys. Fluids, 2019. 31 (10): p. 103302.

Smith, B., et al., Single chip lidar with discrete beam steering by digital micromirror device. Optics Express, 2017. 25 (13): p. 14732-14745.

Suzuki, T., et al., Sequentially timed all-optical mapping photography (STAMP) utilizing spectral filtering. Opt. Express, 2015. 23(23): p. 30512-30522.

Suzuki, T., et al., Single-shot 25-frame burst imaging of ultrafast phase transition of Ge2Sb2Te5 with a sub-picosecond resolution., Appl. Phys. Express, 2017. 10(9): p. 092502.

Takashima, Y. and B. Hellman, Review paper: imaging lidar by digital micromirror device, Optical Review, 2020. 27(5): p. 400-408.

Tiwari, V., M. Sutton, and S. McNeill, Assessment of high speed imaging systems for 2D and 3D deformation measurements: methodology development and validation. Exp. Mech., 2007. 47(4): p. 561-579.

Vogel, A., S. Busch, and U. Parlitz, Shock wave emission and cavitation bubble generation by picosecond and nanosecond optical breakdown in water, J. Acoust. Soc. Am., 1996. 100(1): p. 148-165.

(56) References Cited

OTHER PUBLICATIONS

Vogel, A. and V. Venugopalan, Mechanisms of pulsed laser ablation of biological tissues., Chem. Rev., 2003. 103(2): p. 577-644.

Vogel, A., et al., Femtosecond-laser-induced nanocavitation in water: implications for optical breakdown threshold and cell surgery., Phys. Rev. Lett., 2008. 100(3): p. 038102.

Wang, P., J. Liang, and L. Wang, Single-shot ultrafast imaging attaining 70 trillion frames per second., Nat. Commun., 2020. 11(2091).

Yang—Monitoring damage propagation using PZT impedance transducers Smart Mater., Struct. 18 (2009) 045003 (9pp).

Yuan, X., D.J. Brady, and A.K. Katsaggelos, Snapshot compressive imaging: Theory, algorithms, and applications. IEEE Signal Process. Mag., 2021. 38(2): p. 65-88.

Zeng, X., et al., High-spatial-resolution ultrafast framing imaging at 15 trillion frames per second by optical parametric amplification. Adv. photonics, 2020. 2(5): p. 056002.

Zhao, L., et al., Femtosecond fluorescence spectroscopy by upconversion with tilted gate pulses., Phys. Chem. Chem. Phys., 2005. 7(8): p. 1716-1725.

Instruments, T. DLP4500 .45 WXGA DMD. Revised May 2022_ Available from: https://www.ti.com/lit/ds/symlink/dlp4500.pdf?ts= 1676164254361.

* cited by examiner

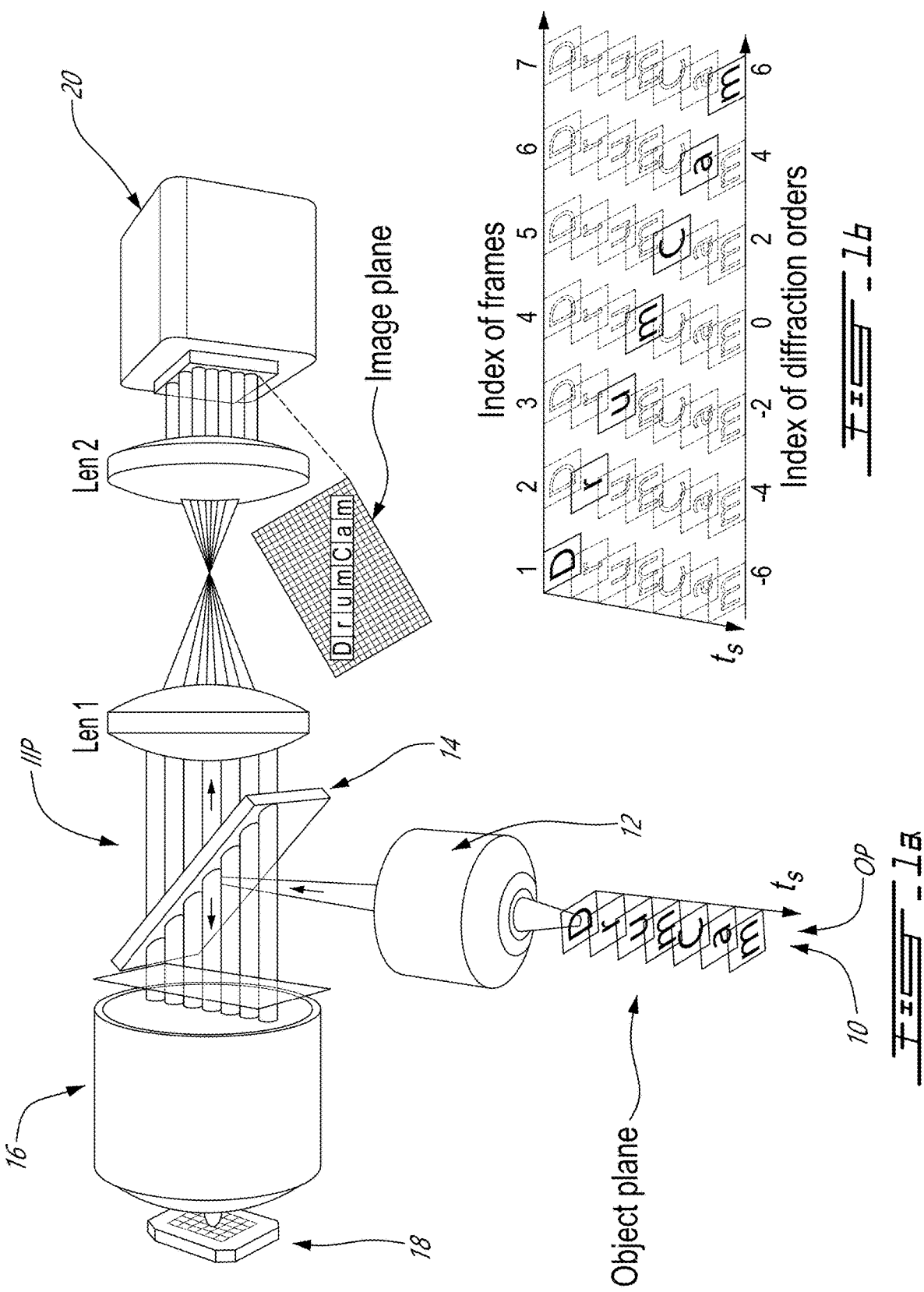

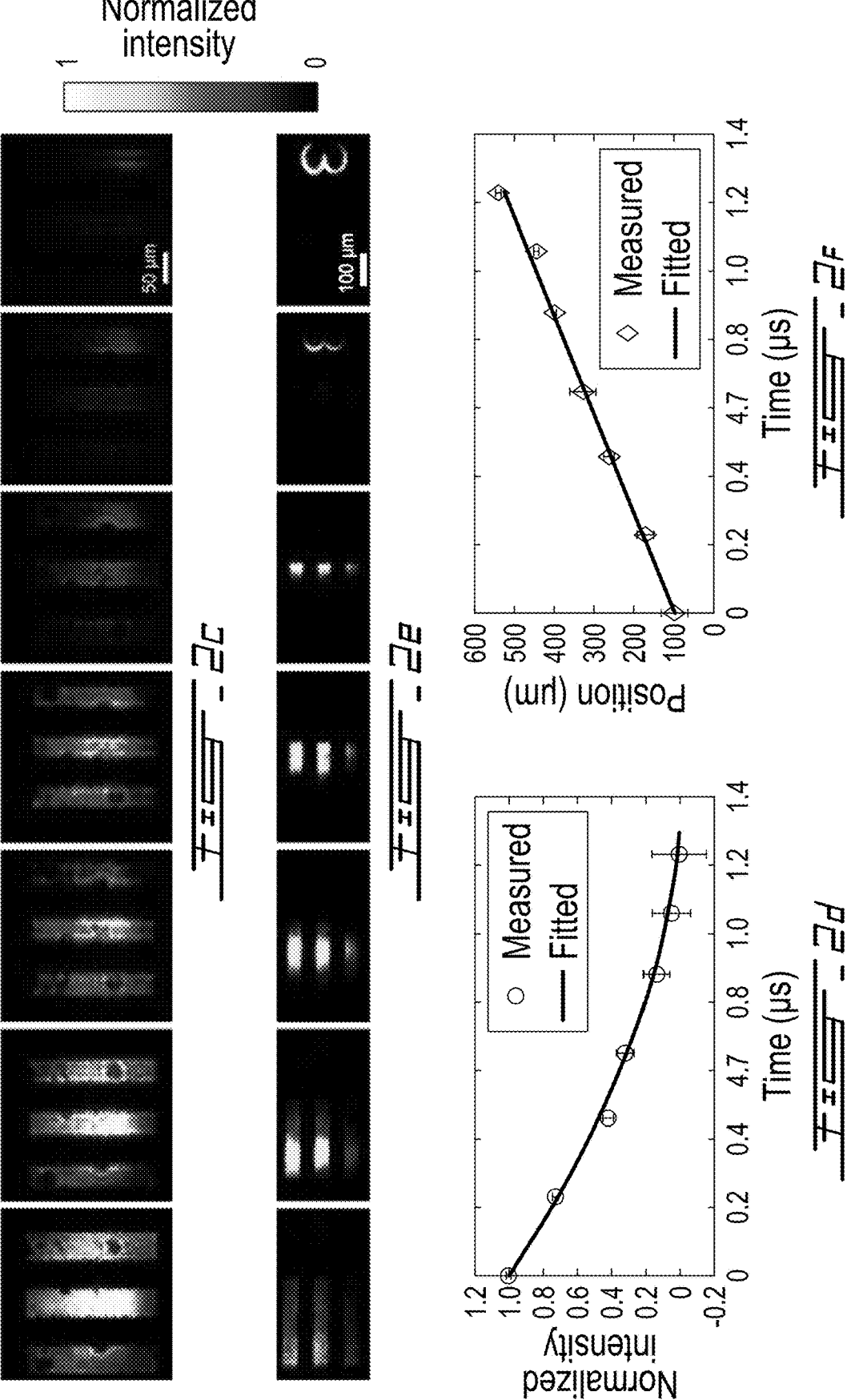

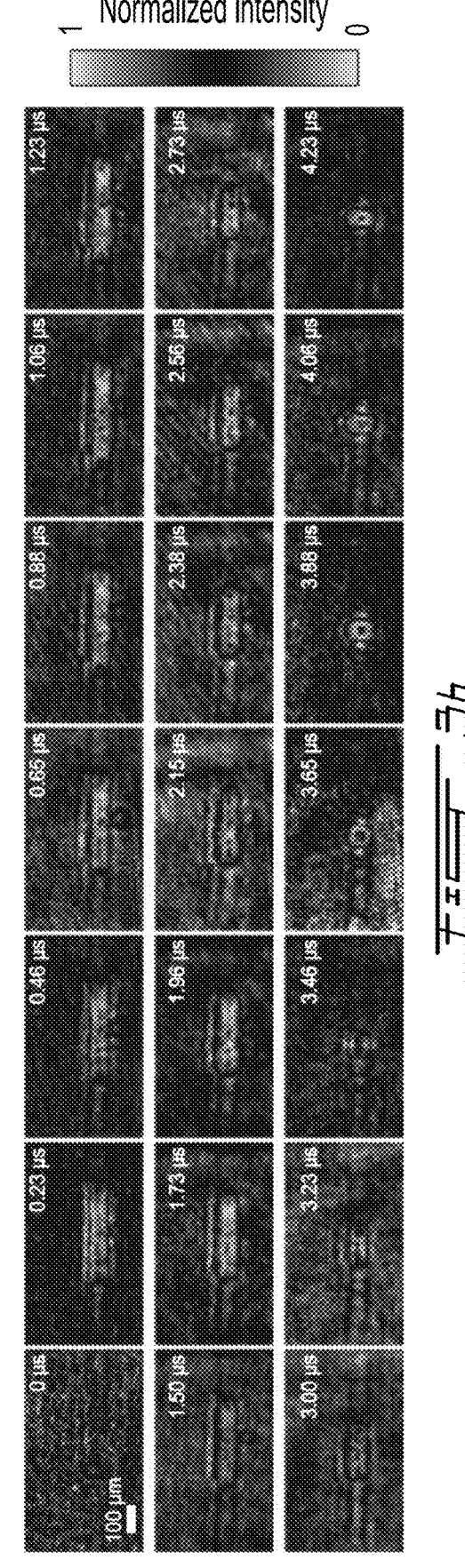

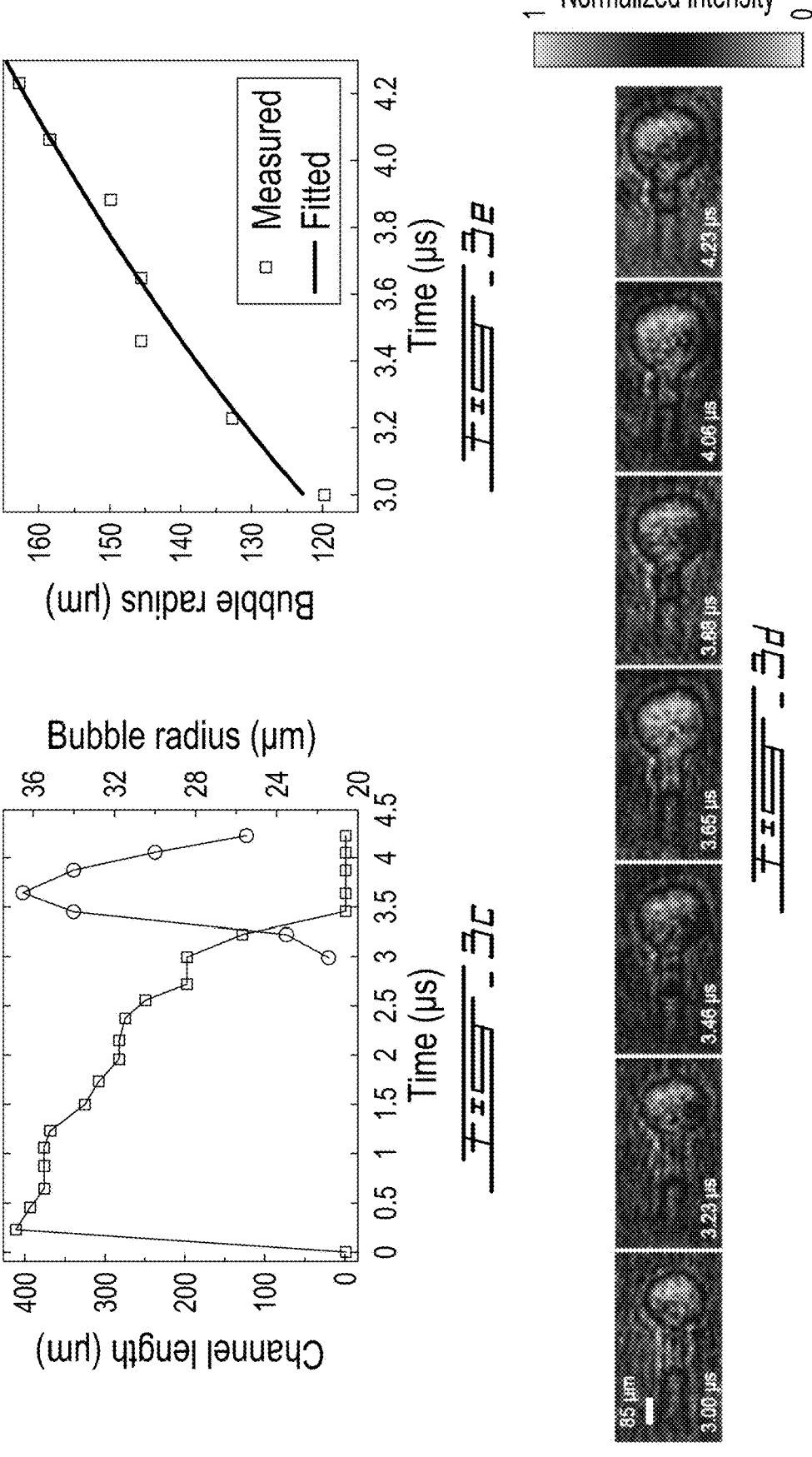

Dichroic mirror

Cuvette with carbonated drink

Laser beam

Objective Lens

Pump pulse

Drum photography

Norm. intensity

Radius (μm)

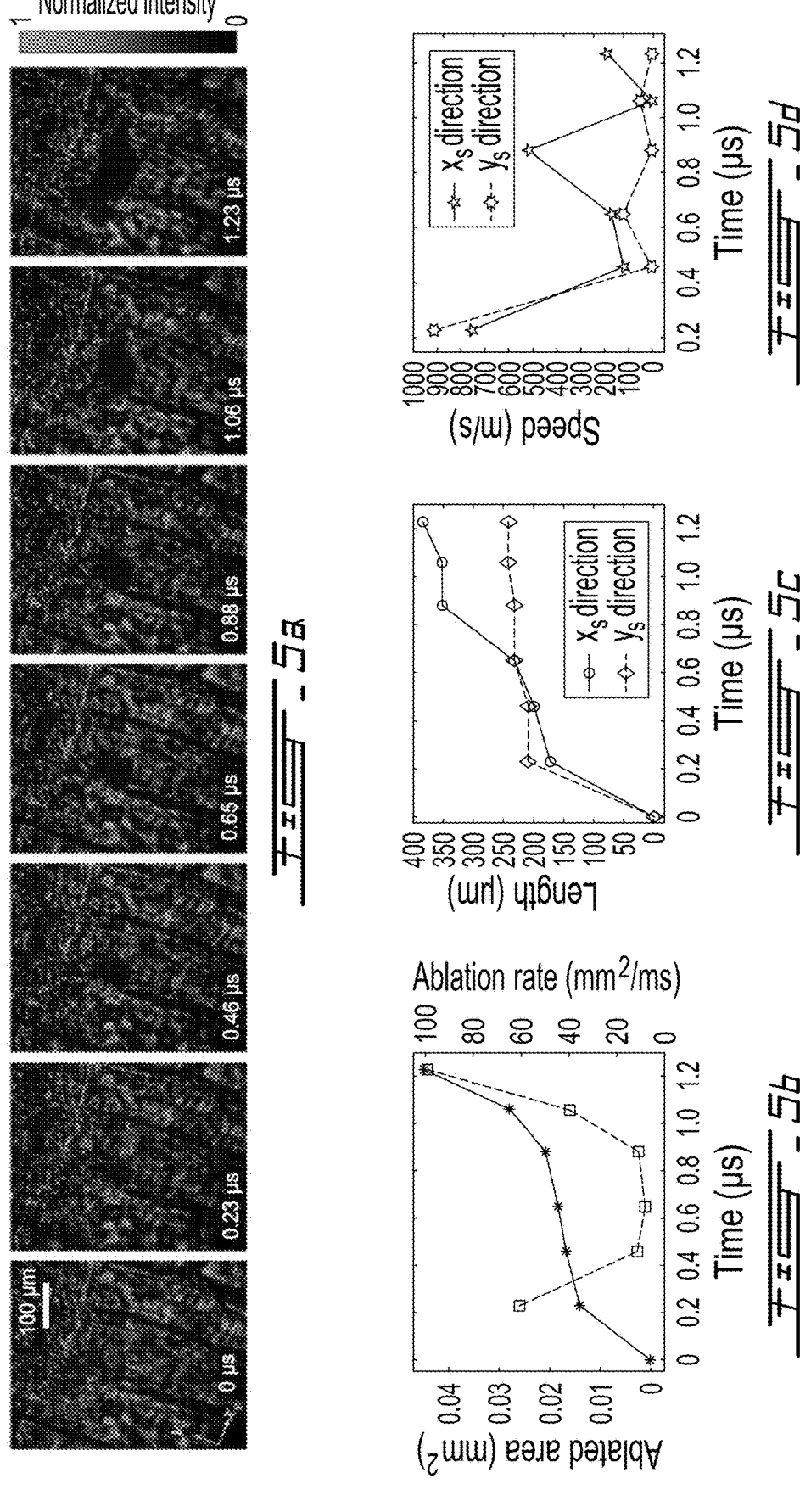

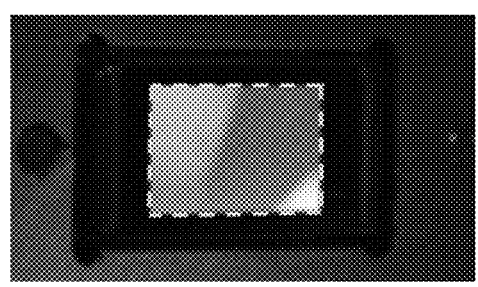
FIG. 6a
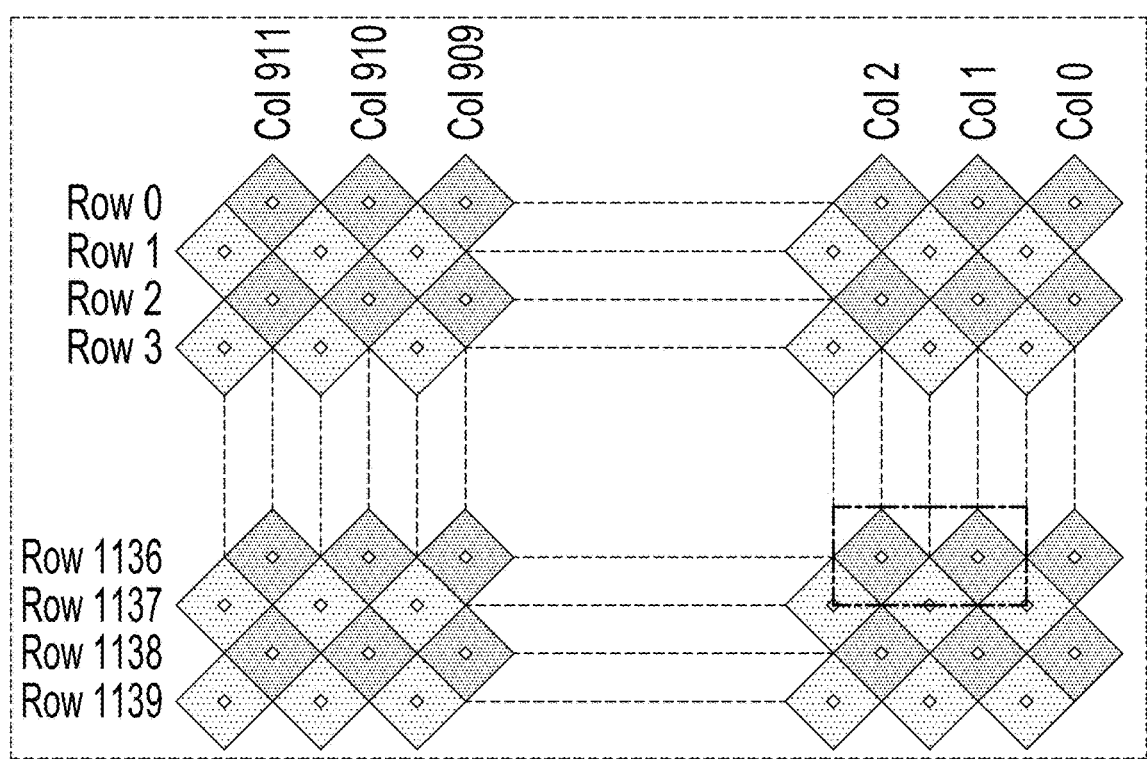
FIG. 6b
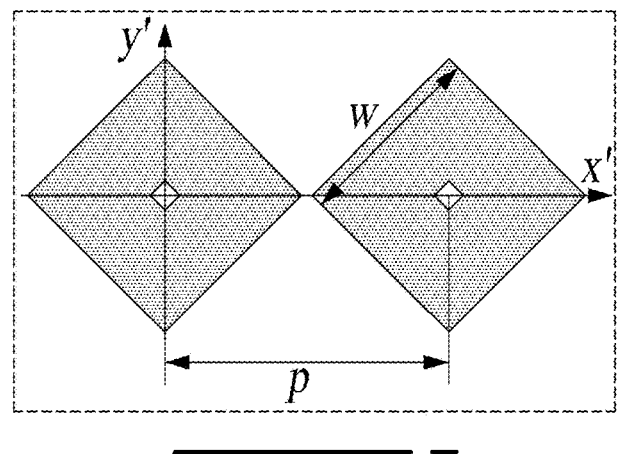
FIG. 6c
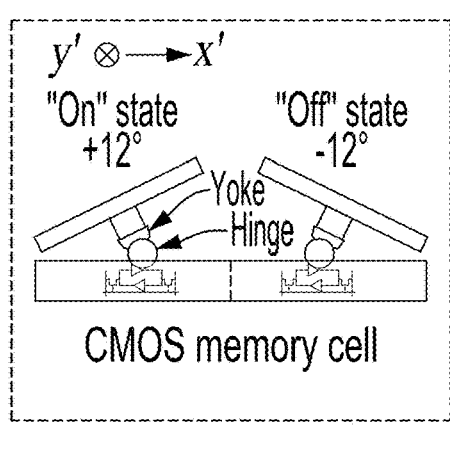
FIG. 6d Normalized intensity Frame 7   Frame 6   Frame 5   Frame 4   Frame 3   Frame 2   Frame 1

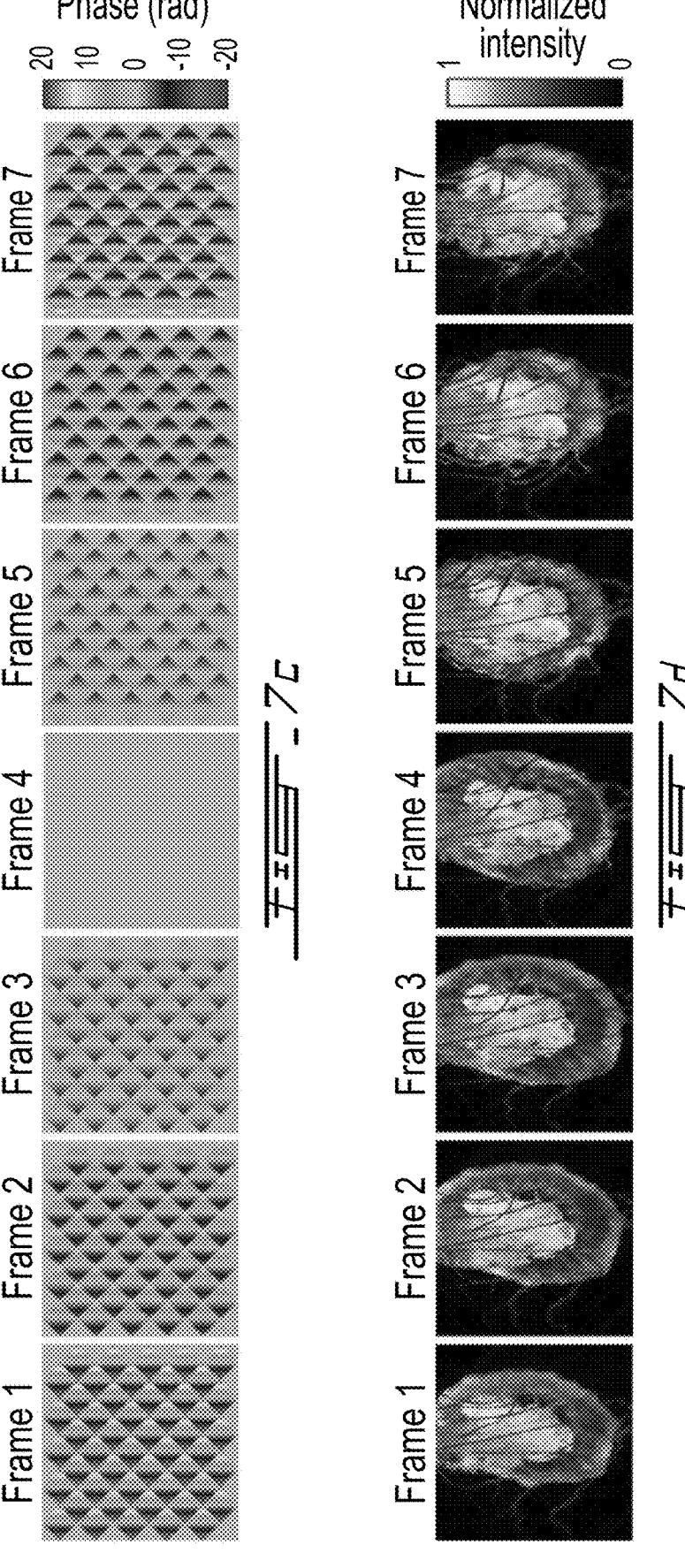

| Modality / Parameters | PFT-based ultrafast imaging | Presently disclosed method |
|---|---|---|
| Time-gating mechanism | Time-space coupling | |
| Methodology | Linear phase in the temporal frequency domain | Linear phase in the spatial frequency domain |
| Mathematical approach | Temporal Fourier transformation | Spatial Fourier transformation |
| Requirement of the light source | Broadband ultrashort pulse | Single-wavelength continuous-wave beam |
| Components | Fixed blaze-angle grating and imaging lens(es) | Tunable blaze-angle grating and Fourier lens |
| Time-gating carrier | Pulse | Diffraction envelope |
| Frame rate | Trillions of frames per second | Millions of frames per second |

FIG. 8a

| Index of diffraction orders / Parameter | -6 | -4 | -2 | 0 | 2 | 4 | 6 |
|---|---|---|---|---|---|---|---|
| Measured location (mm) [Note 1] | -7.32 | -4.67 | -2.24 | 0 | 2.34 | 4.57 | 6.91 |
| Calculated location (mm) [Note 1] | -7.18 | -4.75 | -2.37 | 0 | 2.37 | 4.75 | 7.18 |
| Time point of peak intensity (μs) [Note 2] | 0 | 0.23 | 0.46 | 0.65 | 0.88 | 1.06 | 1.23 |
| Temporal resolution (μs) | 0.39 | 0.37 | 0.36 | 0.37 | 0.37 | 0.37 | 0.36 |

[Note 1]:  The location is marked with respect to the 0th diffraction order.

[Note 2]:  The time point of peak intensity is marked with respect to the -6th diffraction order

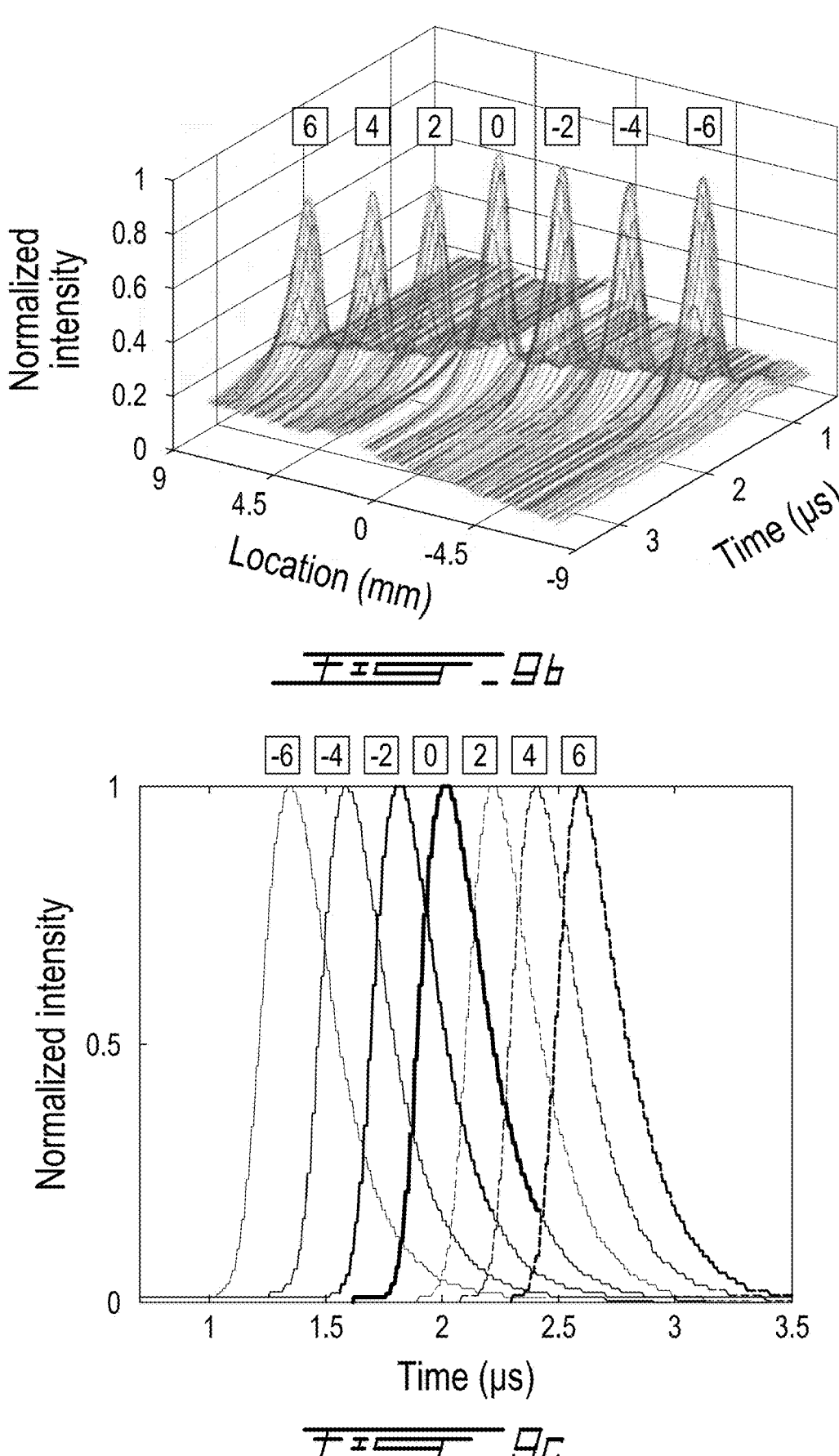
FIG_9b
FIG_9c

DIFFRACTION-GATED REAL-TIME ULTRA-HIGH-SPEED MAPPING PHOTOGRAPHY SYSTEM AND METHOD

CROSS REFERENCE TO RELATED APPLICATIONS

This application claims benefit of U.S. provisional application Ser. No. 63/505,472, filed on Jun. 1, 2023. All documents above are incorporated herein in their entirety by reference.

FIELD OF THE INVENTION

The present invention relates to high-speed imaging. More specifically, the present invention is concerned with a diffraction-gated real-time ultra-high-speed mapping photography system and method.

BACKGROUND OF THE INVENTION

Single-shot high-speed mapping photography is used as an imaging method for the observation of transient scenes in real time, at their actual time of occurrence. Also referred to as framing, high speed mapping photography maps time-gated frames of a dynamic scene onto different spatial positions, which are recorded by one or many using two-dimensional (2D) detectors. It circumvents the need for ultrafast charge-coupled device (CCD) and complementary metal oxide semiconductor (CMOS) cameras, which may be limited due to limited fill factors and the sensitivity of sensors. High-speed mapping photography features 2D ultrafast imaging ability in comparison to conventional streak imaging. Different from range of computational ultrafast imaging methods, high-speed mapping photography does not require complex optical modulation components such as a spatial encoder and an interferometry setup, or sophisticated image reconstruction using for example convex optimization and deep neural networks. As a result, high-speed mapping photography has a wide application scope unbounded by requirements in spatiotemporal sparsity and bandwidths, and high-speed mapping photography has been implemented in a range of scientific studies, including streamer discharge, phase transition, and shock-wave propagation for example.

A commonly implemented method in single-shot high-speed mapping photography uses beam splitter and gated intensified charge-coupled device (CCD) cameras and results in a trade-off between the sequence depth, in terms of the number of frames in each sequence or movie of several frames captured in a single shot, and light throughout, and because of the requirement of components duplication in each arm after beam splitting, a system scale-up considerably increases the construction cost and operational complexity. Alternative methods are being developed to overcome such limitations, by first transferring the temporal information to selected photon tags such as wavelength, angle, and space for example, and then exploiting selected properties in these photon tags, such as color dispersion and propagation direction for example, to separate temporal slices into to different spatial positions. As they avoid replication of the image of the transient scene, these methods break the trade-off between light throughput and sequence depth. Moreover, they have high flexibility in tuning the sequence depth and other technical specifications based on the same imaging system. Nevertheless, these methods still confront a number of limitations. For example, most of the systems require sophisticated components such as optical parametric amplifiers, a femtosecond pulse shaper, and a highspeed rotating mirror for example. Moreover, the imaging is inherently constrained by the limit of the photon tags used. For example, for time-wavelength mapping, temporal resolution degrades with a larger sequence depth because each image is probed only by a portion of the original spectrum; time-angle mapping may induce parallax errors from different probing directions.

Linear time-space coupling has been studied, such as pulse front tilt (PFT), in which, when a femtosecond pulse is reflected by or transmitted through a diffraction grating, the linear phase added to the temporal frequency spectrum of the incident pulse linearly links the time to one spatial axis. An imaging system is used to produce an output pulse at the original pulse width but with a tunable tilt angle, which provides femtosecond time-gating. Compared to time-wavelength mapping, pulse front tilt (PFT) methods avoid the trade-off between temporal resolution and sequence depth. Because the illumination and/or the detection are perpendicular to the optical axis of the system, pulse front tilt-(PFT-) methods are parallax-free. Leveraging these advantages, linear time-space coupling based on pulse front tilt (PFT) has been used in ultrafast electron microscopy, single-shot autocorrelation measurement, and femtosecond fluorescence spectroscopy. Nevertheless, current systems are still only capable of point-probing or line-probing, and none is readily available for high-speed mapping photography. Moreover, the object being imaged either needs to be spatially uniform or move laterally. Finally, most systems use a femtosecond laser to probe the events, which may pose the potential risk of sample damage.

There is still a need in the art for a high-speed imaging system and method.

The present description refers to a number of documents, the content of which is herein incorporated by reference in their entirety.

SUMMARY OF THE INVENTION

More specifically, in accordance with the present invention, there is provided a high-speed imaging system, comprising a continuous-wave light source, a first imaging unit, a second imaging unit, a time gate, a third imaging unit and a sensor synchronized with the time gate, the light source providing a single-wavelength probing beam used to probe a transient scene, the first imaging unit collecting the transient scene as probed by the probing beam and forming an image of the transient scene; the second imaging unit generating a first Fourier transformation, the time gate generating different replicated images of the transient scene at spatially separated positions as a sequence of images frames; and the third imaging unit relaying the different replicated images to the sensor, for recording images of the transient scene.

There is further provided a high-speed imaging method, comprising probing a transient scene using a single-wavelength continuous wave beam; collecting the transient scene as probed by the probing beam and forming an image of the transient scene; generating a first Fourier transformation, time-gating the image, thereby generating frames of the transient scene at spatially separated positions; relaying the time-gated frames of the transient scene to a sensor synchronized with said time-gating; and recording images.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1A is a schematic view of a system for imaging a transient scene "DRUMCAM", according to an embodiment of an aspect of the present disclosure; FIG. 1B shows index of diffraction orders and index of frames in operation of the system of FIG. 1A;

FIG. 2C shows time-lapse images of the intensity decay of a bar target of each seven frames of FIG. 2A; FIG. 2D shows the normalized average intensity from FIG. 2C as the function of time with fitting; FIG. 2E, as FIG. 2C, showing the laser beam's sweeping motion; FIG. 2F shows the laser beam's horizontal position as a function of time with fitting;

FIG. 3A shows a system according to an embodiment of an aspect of the present disclosure; FIG. 3B shows time-lapse images of the evolution of the plasma channel in distilled water using a 9-$\mu$J pump pulse; FIG. 3C shows time history of the channel length and bubble radius quantified from FIG. 3B; FIG. 3D shows development of cavitation from the plasma channel by using a 10-$\mu$J pump pulse; FIG. 3E shows bubble radius as the function of time from FIG. 3D, fitted by cavitation theory;

FIG. 5A shows time-lapse images, damaged area being delineated by dotted boxes; FIG. 5B shows ablated area and ablation rate as a function of time; FIG. 5C shows lengths of the ablated area in two directions Xs and Ys versus time; and FIG. 5D shows damaged speeds in the two directions Xs and Ys versus time;

FIG. 6A is an image of a 0.45" digital micromirror device (DMD), consisting of an array of micromirrors, the dash-dotted box marking single micromirrors; FIG. 6B shows arrangement in rows and columns of the micromirrors array of the DMD; FIG. 6C is a top view of single micromirrors marked by the dash-dotted box in FIG. 6A, each micromirror, with a rhombus orientation, having a width @ and a pitch p; FIG. 6D is a side view of single micromirrors marked by the dash-dotted box in FIG. 6A, each micromirror being connected to a yoke sitting on top of a hinge positioned in the diagonal direction of the micromirror, each micromirror being controlled independently by a binary circuit of a corresponding CMOS memory cell, the hinge enabling the micromirror to tilt on the x' axis, to either the "On" state or the "Off" state from the surface normal;

FIG. 7 show simulations of a system according to an embodiment of the present disclosure: FIG. 7C shows phase profiles of the 50 micromirrors corresponding to each frame 1-7 in the ground truth; FIG. 7D shows frames 1-7 of the photography obtained by the system.

FIG. 8A shows comparison of pulse front tilt (PFT)-based ultrafast imaging and an imaging method according to an aspect of the present disclosure.

FIG. 9 show characterization of temporal resolution of imaging according to an embodiment of an aspect of the present disclosure: FIG. 9B shows time histories of the intensity measured by the photodiode scanning across the locations from the −6th to the 6th diffraction orders; FIG. 9C shows time histories of intensity at the center of each diffraction order, selected from FIG. 9B; and FIG. 10 show imaging of laser-induced breakdown (LIB) in oil according to an embodiment of an aspect of the present disclosure.

DESCRIPTION OF ILLUSTRATIVE EMBODIMENTS

Figure 2A:
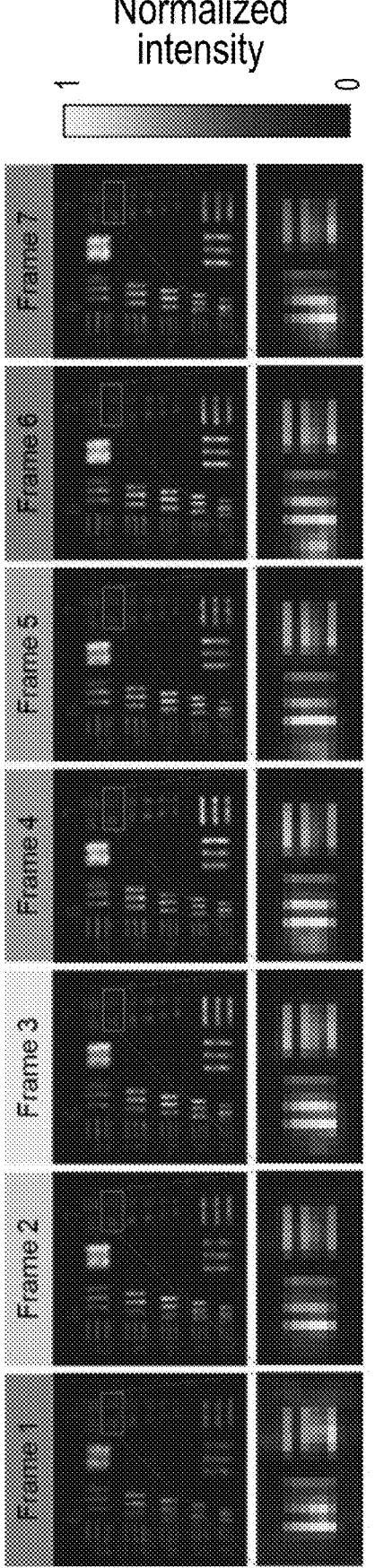
FIG. 2A shows spatial resolution of seven frames tested with USAF microscopic optical resolution test device resolution target.

The present invention is illustrated in further details by the following non-limiting examples.

A system according to an embodiment of an aspect of the present disclosure is illustrated in FIG. 1A.

A continuous-wave beam from a continuous-wave light source 10 is used to probe a transient scene "DRUMCAM" at the object plane OP. The light transmitted by the scene is collected by a finite objective lens 12, reflected by a beam splitter 14, and forms an image of the transient scene on the intermediate image plane IIP. An infinitely corrected objective lens with a tube length for example may be used as an alternative to collect the light transmitted by the scene. Experiments presented herein used a CNI Laser, wavelength of 473 nm and power of 200 mw, a finite objective lens Nikon, CF Achro; magnification ratio of 4× and numerical aperture (NA) of 0.1 and a Thorlabs, BP250 beam splitter 14.

Then, the interaction is brought between a stereoscopic objective lens 16 or a lens of numerical aperture selected according to a spatial light modulator 18, in either reflective and transmissive spatial light modulation. Experiments presented herein used a folded 4f imaging system consisting of a stereoscopic objective lens (Olympus, MVPLAPO2XC, 0.5 NA) and a digital micromirror device (DMD) used as a reflective programmable blazed grating (Ajile Light Industries, AJD-4500), its diffraction being used as time gate for seeing the dynamic scene: corresponding to the different diffraction orders generated by the DMD, different replicated images of the transient scene are formed at spatially separated positions on the intermediate image plane IIP. The different replicated images of the transient scene are relayed by a second 4f imaging system, consisting of a first lens Len1 (Thorlabs, AC508-100-A) and a second lens Len2 (Thorlabs, AC508-75-A), to a sensor 20 for recording images of the transient scene "DRUMCAM" at the image plane (CMOS camera Optronis, CP70-1HS-M-1900, exposure time of about 5 microseconds, prior to the onset of the DMD flipping of about 2 microseconds), rotated by about 34° to accommodate the different replicated images. Other tunable blaze-angle gratings and Fourier lens may be selected for spatial Fourier transformation.

DMDs with a flipping time of the DMD in a range between 1 and 3 microseconds may be selected. Other spatial light modulators (SLM) and flipping times ranging from nanoseconds to microseconds may be used, such as DMDs, liquid crystal spatial light modulators (SLM), and deformable mirrors for example.

The sensor 20 and the DMD 18 are synchronized so that the swept diffraction envelope can be captured: the exposure of the sensor 20 is synchronized with the flipping motion of the DMD 18 as detailed hereinbelow in relation to the System synchronization section hereinbelow, by mirror array flipping by DMD or other pixelated spatial light modulator. The change of the tilt angle of each micromirror of the DMD 18 results in a time-varying phase profile (FIG. 7C), which causes sweeping of the diffraction envelope through the diffraction orders located in its moving trajectory. The sequential dwelling of the diffraction envelope generates successive temporal slices of the transient scene as illustrated in FIG. 1B, with $t_s$ the time of the dynamic scene.

Figure 2B:
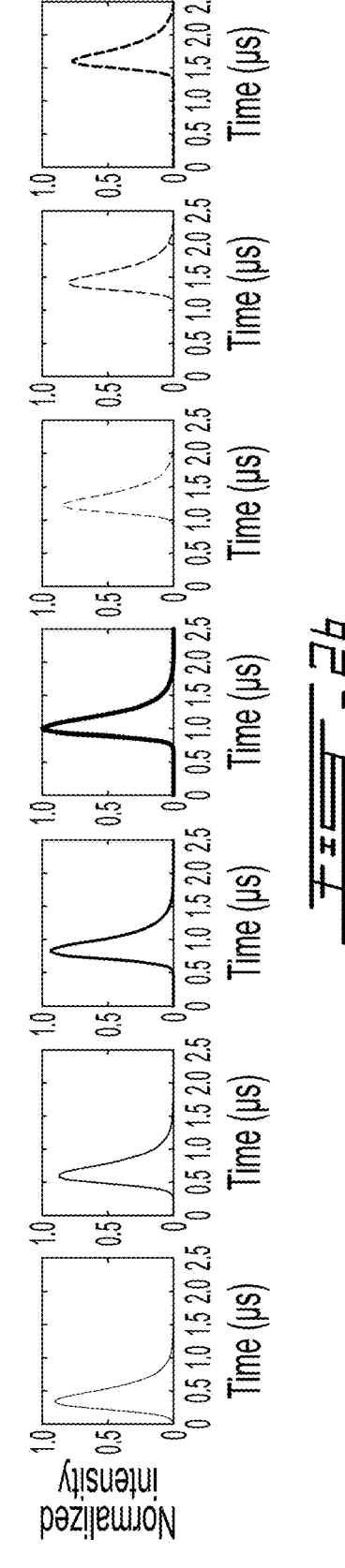
FIG. 2B shows the temporal response at the center of each diffraction order of each seven frames of FIG. 2A, in terms of normalized intensity versus time.
Figure 4A:
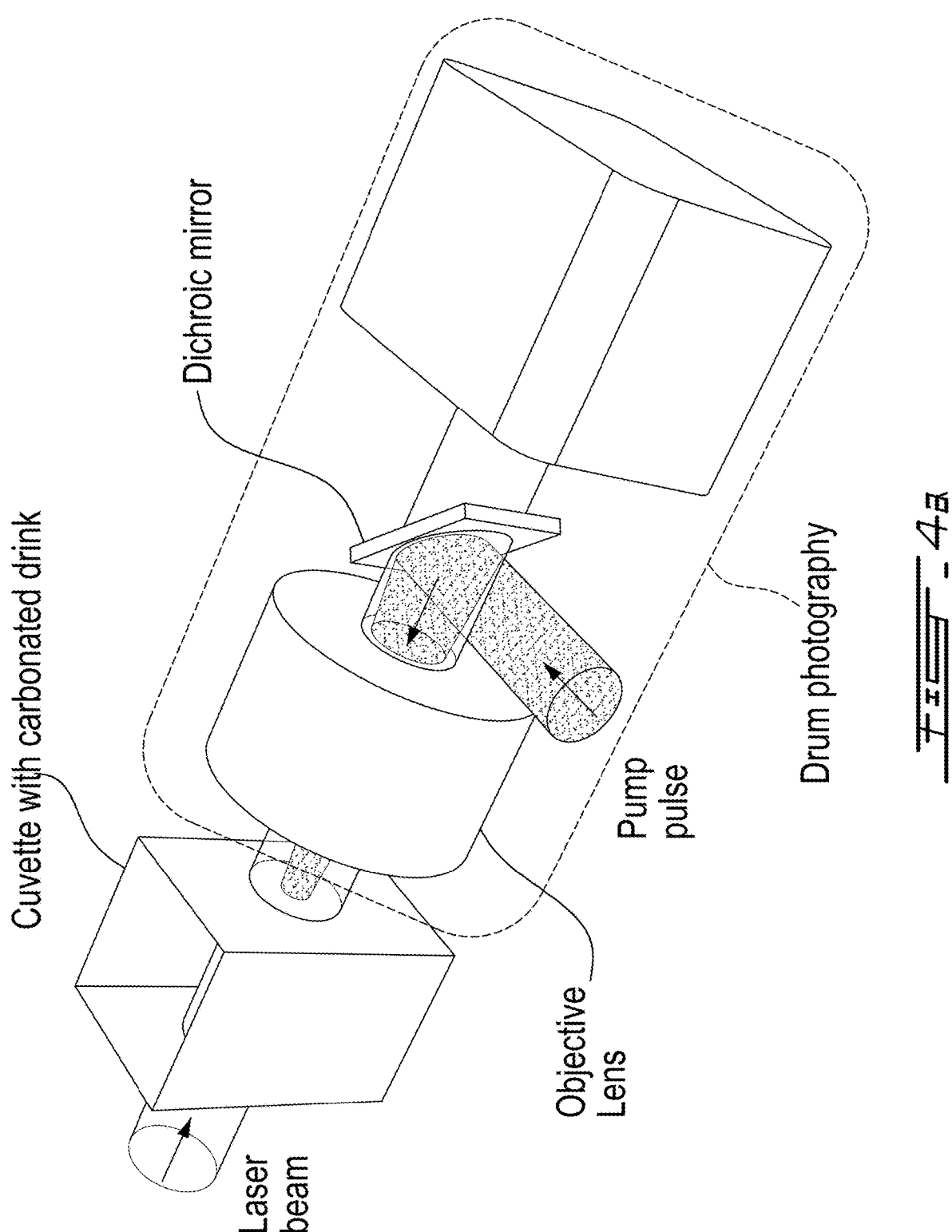
FIG. 4A shows a system according to an embodiment of an aspect of the present disclosure.
Figure 4B:
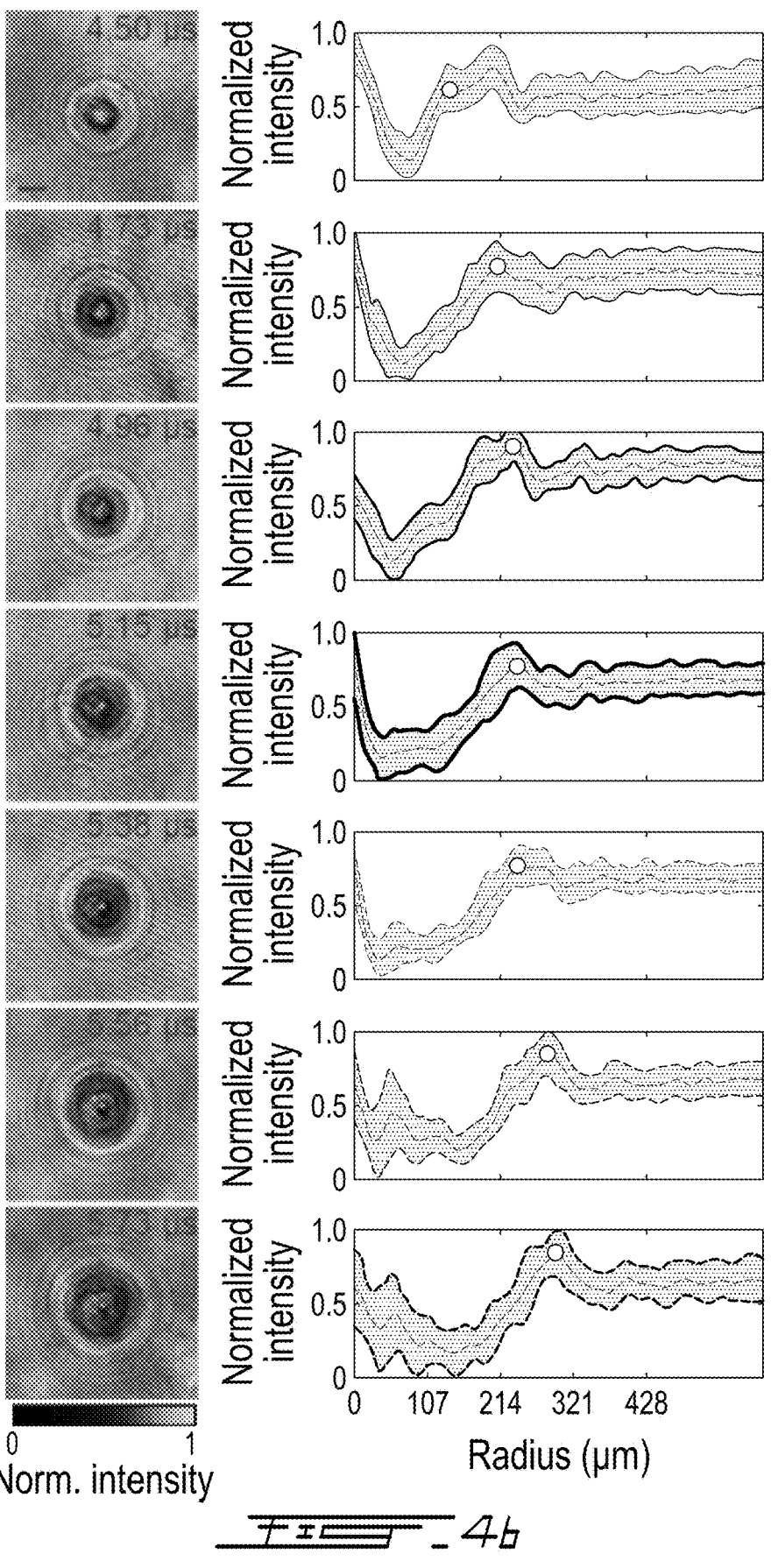
FIG. 4B shows time-lapse images of a pump-pulse-generated bubble (left column) and the normalized intensity profiles averaged in the radial direction (right column), with scale bar: 200 $\mu$m; the dot marking the first turning point of the line profile from the intensity minimum, which is used to determine the bubble radius.
Figure 4C:
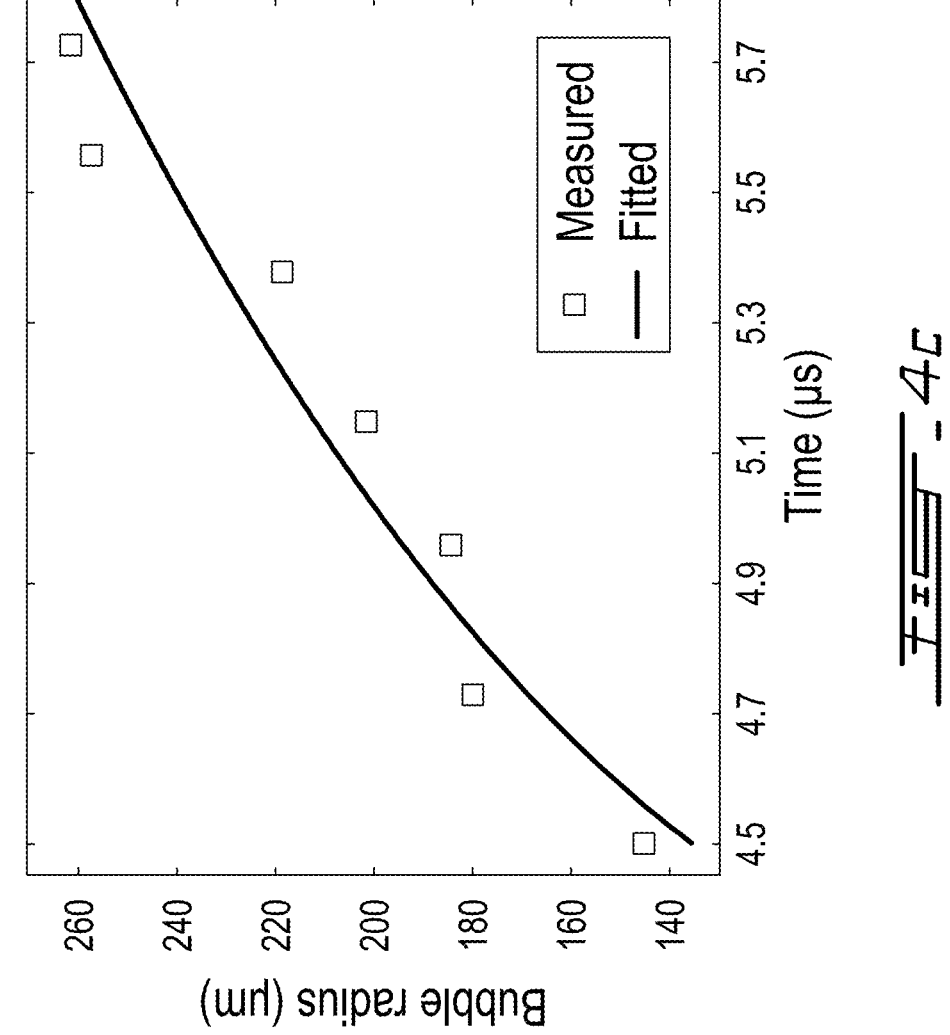
FIG. 4C shows bubble radius as the function of time fitted by the cavitation theory.

FIG. 2 show characterization of the presently disclosed method. FIG. 3 show observation of laser-induced breakdown in distilled water. FIG. 4 show front-view imaging of cavitation dynamics and FIG. 5 show imaging the laser ablation of single-layer onion cells using the presently disclosed method.

To illustrate the working principle of the presently disclosed photography method and system photography, the configuration of the 0.45" digital micromirror device (DMD, Ajile, AJD-4500) and its operating principles are detailed, then, photography's image acquisition is derived, and the photography system's parameters, such as frame rate and temporal resolution, are investigated hereinbelow in relation to FIGS. 6-10.

Configuration of the 0.45" DMD

The 0.45" DMD (FIG. 6A) consists of an array of micromirrors of $N_c \times N_r = 912 \times 1140$ (FIG. 6B). Each micromirror, with a rhombus orientation, has a width of w=7.6 μm and a pitch of p=10.8 μm (FIG. 6C). Each micromirror is connected by a post to a yoke sitting on top of a hinge positioned in the diagonal direction of the micromirror. Each micromirror is controlled independently by a binary circuit of the corresponding CMOS memory cell. The hinge enables the micromirror to tilt on the x-axis. The electrostatic force will latch the micromirrors to the tilt angle $\theta_h$ of either $\theta_{b-on}=+12°$ (i.e., the "On" state) or $\tau_{b-off}=-12"$ (i.e., the "Off" state) from the surface normal (FIG. 6D). Thus, conventionally, the DMD functions as a programmable binary two-dimensional (2D) blazed diffraction grating.

Derivation of Diffraction-Gated Real-Time Ultrahigh-Speed Mapping Photography's Image Acquisition First, the impulse response of the diffraction-gated real-time ultrahigh-speed mapping (DRUM) photography system is derived. For simplicity of notation, the following assumptions are made. First, the first imaging system has a unit magnification. Second, the dynamic scene can be perfectly imaged. Third, all micromirrors of the DMD are flipped simultaneously and linearly.

A point on the objective plane is first imaged by the microscope objective lens to the intermediate image plane. Then, it is Fourier transformed by the stereoscopic objective lens, resulting in a plane wave illuminating the 0.45" DMD placed at the back focal plane of this stereoscopic objective lens. Each rhombus micromirror, denoted as $S$, can be modeled as follows:

$$S(f_x, f_y) = rect\left(\frac{\lambda f(f_x - f_y)}{\sqrt{2}\,w}, \frac{\lambda f(f_x + f_y)}{\sqrt{2}\,w}\right). \tag{S1}$$

$\lambda$ is the wavelength, and f is the focal length of the stereoscopic objective lens $f_x = x'/\lambda f$ and, $f_y = y'/\lambda f$ are spatial frequencies in the x' direction and the y' direction, respectively (FIG. 6C).

The micromirror array on the DMD can be regarded as the combination of two subgroups. The first subgroup, marked by the darker shade in FIG. 6B, is modeled by the convolution of the single micromirror function, $S$, with a comb function within a window, expressed as follows:

$$A_1(f_x, f_y) = \tag{S2}$$

$$\left[S(f_x, f_y) \otimes \sum_{m',n'=-\infty}^{\infty} \delta(\lambda f f_x - m'p, \lambda f f_y - n'p)\right] \cdot rect\left(\frac{\lambda f f_x}{L_{x'}}, \frac{\lambda f f_y}{L_{y'}}\right)$$

$L_x = (2N_a+1)p/2$ and $L_y = (N_r+1)p/2$ are the DMD's window sizes in the x' direction and the y' direction, respectively m' and n' are the indices of the micromirrors. The second subgroup of micromirrors, marked by the light shade in in FIG. 6B, is a replica of the first group but shifted by a half pitch in both the x' direction and the y' direction. Therefore, it can be modeled as follows:

$$A_2(f_x, f_y) = A_1\left(f_x - \frac{p}{2\lambda f}, f_y - \frac{p}{2\lambda f}\right) \tag{S3}$$

In this way, the entire micromirror array on the DMD is expressed as follows:

$$A(f_x, f_y) = A_1(f_x, f_y) + A_2(f_x, f_y). \tag{S4}$$

For the plane wave illuminating the DMD with an amplitude of $\alpha$ and an incident angle of $\theta_i$ to its surface normal, the deflected beam has the angle of $-\theta_n = \theta_i - 2\theta_n$. Then the micromirror modulates the incident light by adding a phase ramp, expressed as follows:

$$S_r(f_x, f_y) = aS(f_x, f_y)\exp[-i2\pi f f_x(\sin\theta_o + \sin\theta_i)] \tag{S5}$$

Hence, the complex field of the deflected light is modeled as follows:

$$A_{1r}(f_x, f_y) = \tag{S6}$$

$$\left[S_r(f_x, f_y) \otimes \sum_{m',n'=-\infty}^{\infty} \delta(\lambda f f_x - m'p, \lambda f f_y - n'p)\right] \cdot rect\left(\frac{\lambda f f_x}{L_{x'}}, \frac{\lambda f f_y}{L_{y'}}\right)$$

The complex amplitude profile at the intermediate image plane is, using spatial Fourier transformation of $A_{1r}(f_x, f_y)$, which is as follows:

$$U_{1r}(x, y) =$$

$$c_r \cdot \left\{ sinc\left[ \frac{x - f(\sin\theta_o + \sin\theta_i) - y}{\sqrt{2}\,\lambda f/w}, \frac{x - f(\sin\theta_o + \sin\theta_i) + y}{\sqrt{2}\,\lambda f/w} \right] \cdot \right.$$

$$\left. \sum_{m,n=-\infty}^{\infty} \delta\left(x - \frac{m\lambda f}{p}, y - \frac{n\lambda f}{p}\right) \right\} \otimes sinc\left(\frac{xL_{x'}}{\lambda f}, \frac{yL_{y'}}{\lambda f}\right), \tag{S7}$$

with the constant $c_r = \alpha w^2 L_x L_y / p^2 \lambda^4 f^4$. Using the shifting theorem in Fourier transformation, the spatial Fourier transform of $A_{2r}$ can be expressed as follows:

$$U_{2r}(x, y) = U_{1r}(x, y) \cdot \exp\left[ -i\pi \frac{p(x+y)}{\lambda f} \right] \tag{S8}$$

Finally, the optical field at the intermediate image plane is written as follows:

$$U_r(x, y) = U_{1r}(x, y) + U_{2r}(x, y). \tag{S9}$$

Data is acquired during the flipping of micromirrors from one state to the other. The flipping motion, which occurs in the x" direction, results in a moving diffraction envelope in the x direction. Thus, the analysis is restricted to the diffraction orders distributed in the x direction. With a further assumption that the point of the object plane resides at the center, Relation (S9) may be simplified as follows:

$$U_r(x) = c_r \left[ 1 + \exp\left(-i\pi p \frac{x}{\lambda f}\right) \right] \cdot$$

$$\left\{ \left[ sinc\left( \frac{x - f\sin(2\theta_b)}{\frac{\sqrt{2}\lambda f}{w}} \right) \cdot \sum_{m=-\infty}^{\infty} \delta\left(x - \frac{m\lambda f}{p}\right) \right] \otimes sinc\left(\frac{xL_{x'}}{\lambda f}\right) \right\}, \tag{S10}$$

$\theta_b$, as a function of time t, represents the time-dependent tilt angle of the micromirrors. The intensity along the x axis may be obtained as follows:

$$I_r(x, t) = 2c_r^2 (1 + \cos m\pi) \cdot$$

$$\left\{ \left[ sinc\left( \frac{x - f\sin(2\theta_b)}{\frac{\sqrt{2}\lambda f}{w}} \right) \cdot \sum_{m=-\infty}^{\infty} \delta\left(x - \frac{m\lambda f}{p}\right) \right] \otimes sinc\left(\frac{xL_{x'}}{\lambda f}\right) \right\}^2, \tag{S11}$$

Finally, this intensity profile is relayed to the image plane by the 4f imaging system. In this way, for any dynamic scene on the object plane, denoted by I(x,y,t), the image recorded by the sensor is expressed as follows:

$$E(x, y) = \int I(x, y, t) \otimes I_r(x, t)\,dt. \tag{S12}$$

During the operation, the information of the dynamic scene is carried in each diffraction order in the x direction. Meanwhile, the time-dependent tilt angle rapidly moves the diffraction envelope along the x direction. This sweeping motion slices out sequential frames from different diffraction orders (FIG. 1B). Thus, this diffraction gating enables single-shot transient imaging ability in diffraction-gated real-time ultrahigh-speed mapping (DRUM) photography.

Investigation of Parameters of Diffraction-Gated Real-Time Ultrahigh-Speed Mapping Photography Parameters of the method and system are derived based on the result derived above. First, the number of frames residing between the sweeping range of the diffraction envelope is computed using the terms $$\sum_{m=-\infty}^{\infty} \delta\left(x - \frac{m\lambda f}{p}\right)$$

and $(1+\cos m\pi)$ in Relation (S11). In particular, the second term indicates zero intensity of all diffraction orders when in is an odd integer. As seen from Relation (S4), because $A_2(f_x, f_y)$ is a replicant of $A_1(f_x, f_y)$ with a half-period shift, their diffraction fields destructively interfere when an is an odd integer. Alternatively, the addition of these two terms suggests the reduction of the period by half in the x' direction, which doubles the distance of adjacent diffraction orders in the x direction. Using the wavelength $\lambda$=473 nm, the calculation shows that a total of nine diffraction orders (i.e., m=0, ±2, ±4, ±6, ±8) lie in the sweeping range of the diffraction envelope. The first and the last diffraction orders, i.e., m=±8, are located near the positions of the diffraction envelope when the micromirrors are static i.e. $\theta_b = \theta_{b\text{-}off}$ or $\theta_{b\text{-}on}$. The much longer dwelling time of the diffraction envelope in these two orders generates a large intensity difference from that of the other diffraction orders and mitigates their time-gating ability. Therefore, they are excluded in diffraction-gated real-time ultrahigh-speed mapping photography, bringing its sequence depth to seven frames.

Second, the frame rate of photography is derived. The micromirror flipping in the x' axis obeys $t \in [0, t_f]$, where $t_f$ is the total time of the flipping operation, and $\theta_b \in [\theta_{b\text{-}off}, \theta_{b\text{-}on}]$. The sweeping speed of the diffraction envelope in the x direction is as follows:

$$v_{de} = 2fM_{4f}\frac{d\theta_b}{dt}, \tag{S13}$$

where f denotes the focal length of the stereoscopic objective lens, and $M_{4f}$ denotes the magnification ratio of the 4f imaging system (consisting of Lens 1 and Lens 2; see FIG. 1A).

The distance between adjacent even diffraction orders (i.e., $\Delta$m=2) is as follows:

$$\Delta x = \frac{2fM_{4f}\lambda}{p}. \tag{S14}$$

By plugging in the values f and $M_{4f}$, under the paraxial approximation, the average distance between adjacent even diffraction orders is $\Delta$x=2.39 mm.

The frame rate of diffraction-gated real-time ultrahigh-speed mapping (DRUM) photography is as follows:

$$r_{DRUM} = \frac{v_{de}}{\Delta x}. \tag{S15}$$

Finally, the temporal resolution of diffraction-gated real-time ultrahigh-speed mapping photography, $t_y$, is jointly as follows: the width of the sinc function in Relation (S11), the sweeping speed in Relation (S13), and the image field of view (FOV).

Simulation of Diffraction-Gated Real-Time Ultrahigh-Speed Mapping Photography

Figures 7A, 7B:
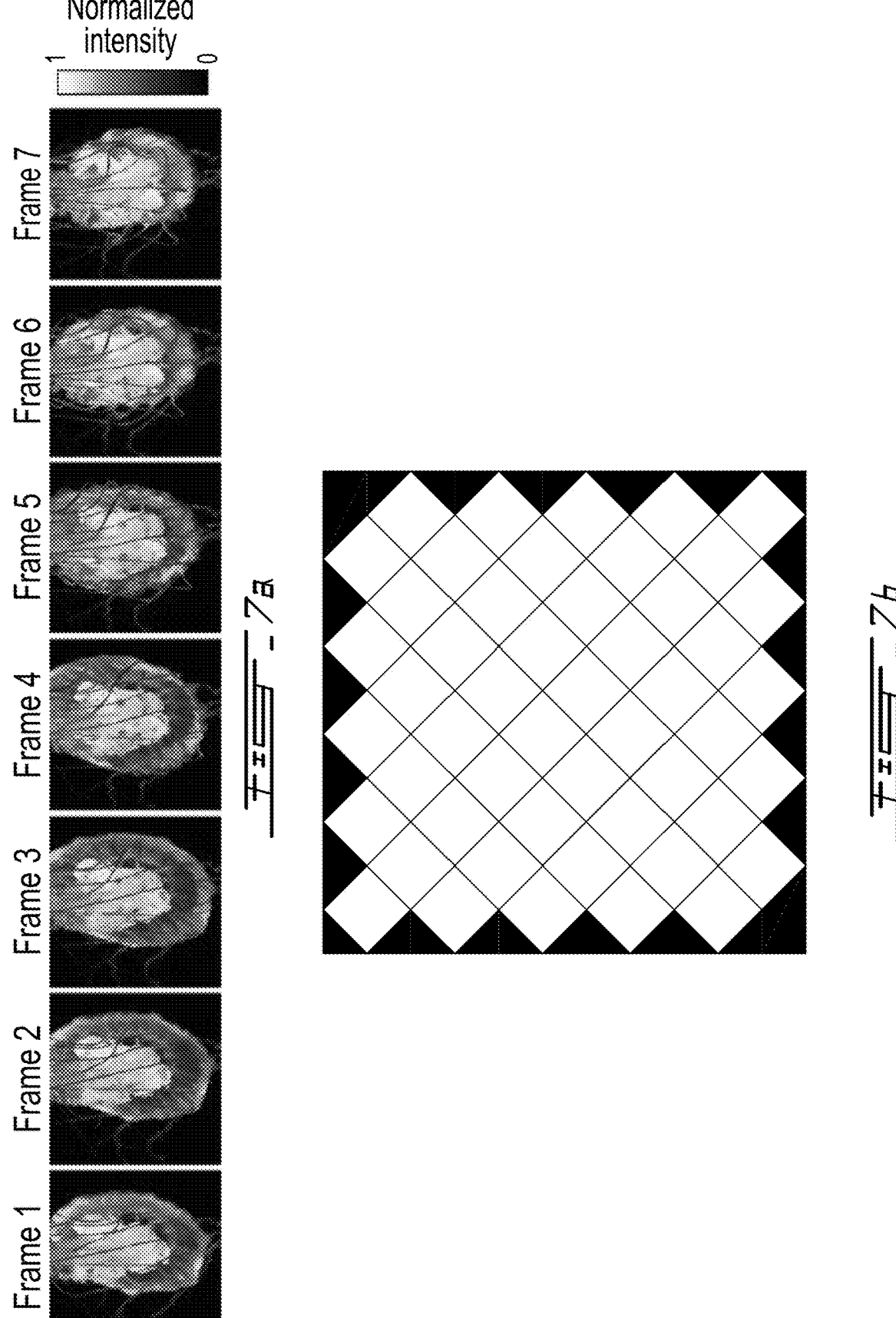
FIG. 7A shows frames 1-7 of the ground truth of a dynamic scene.
FIG. 7B shows the layout of the system's DMD's aperture with the example of 50 micromirrors.
Figure 7E:
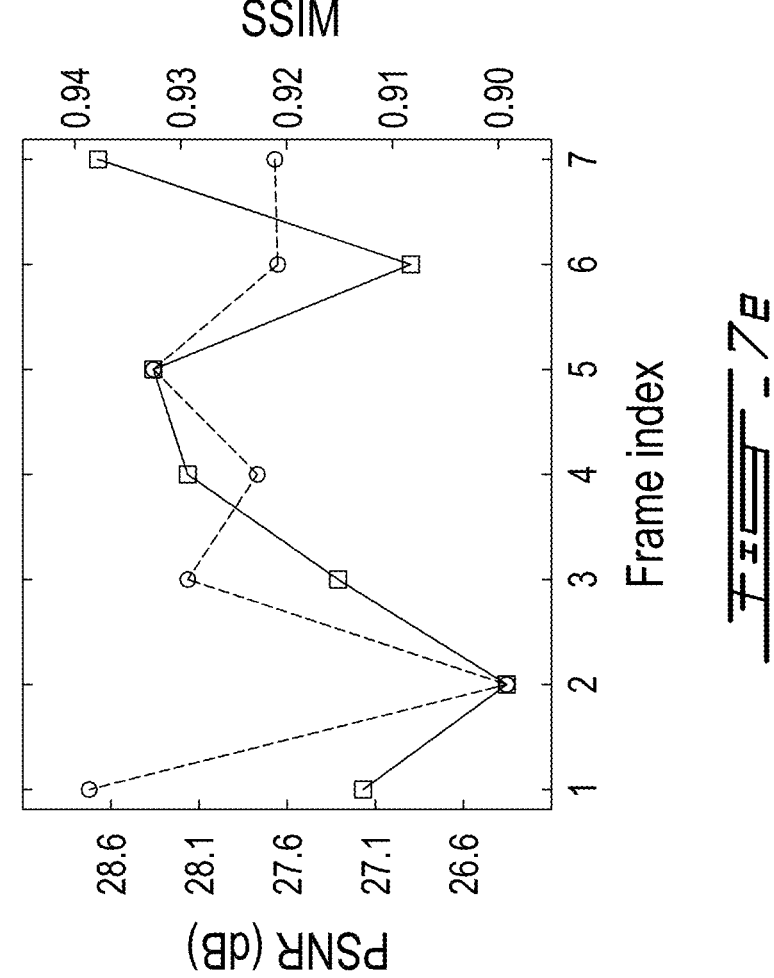
FIG. 7E shows peak single-to-noise ratio (PSNR) (stippled line) and structural similarity index measure (SSIM) (full line) of each frame 1-7.
Figure 8B:
FIG. 8B shows characteristics of dynamic diffraction produced by the 0.45" DMD used in a system according to an aspect of the present disclosure.

To test the feasibility of diffraction-gated real-time ultrahigh-speed mapping photography, the system performance is numerically simulated using a dynamic jellyfish scene (FIG. 7A) as the ground truth, which contains seven frames, each with a size of 4000×4000 pixels. Following the conditions listed in the Derivation of diffraction-gated real-time ultrahigh-speed mapping photography's image acquisition section hereinabove, a 4000×4000-pixel array was used to simulate a 1-mm FOV. Each micromirror, which has a rhombus shape with a pitch of 10.8 μm in the diagonal direction, occupied 44×44 pixels. The micromirror array's fill factor was set as 92.5%. Thus, a 186×93-micromirror array was used in the simulation. A local region containing 10×5 micromirrors is plotted in FIG. 7B. Each micromirror was modeled to have a constant amplitude. The light modulation from the micromirror's flipping motion changed the phase profile. As an example, the time-dependent phase profiles in the 10×5-micromirror region shown in FIG. 7B are plotted in FIG. 7C. The frames produced by diffraction-gated real-time ultrahigh-speed mapping photography are shown in FIG. 7D. As a quantitative comparison, the peak signal-to-noise ratio (PSNR) and structural similarity index measure (SSIM) of each reconstructed frame were computed as shown in FIG. 7E. The averaged PSNR and SSIM of the reconstructed seven frames are 27.8 and 0.92, respectively. The reconstructed dynamic jellyfish using the simulation of diffraction-gated real-time ultrahigh-speed mapping photography has a good agreement with the ground truth.

Link between the principles of pulse front tilt (PFT)-gated ultrafast imaging to diffraction-gated real-time ultrahigh-speed mapping photography.

In a typical pulse front tilt (PFT)-gated ultrafast imaging system, PFT is generated by a diffraction grating and an imaging system. In particular, a Gaussian pulse propagating in the z direction incident to the diffraction grating is modeled as follows:

$$E_i(y, t') = \exp\left\{-\left[\left(\frac{y}{y_i}\right)^2 + \left(\frac{t'}{\tau_i}\right)^2\right]\right\}, \tag{S20}$$

$y_i$ is the spatial width of this pulse on the y-axis, and $\tau_i$ is the pulse duration. $t'=t-z/c$ is the time delay, in which e denotes the speed of light. The temporal frequency spectrum of the incident Gaussian pulse, $E_i(y,\omega)$, is given as follows:

$$E_i(y, \omega) = \int_{-\infty}^{\infty} E_i(y, t') \exp(-i\omega t')dt', \tag{S21}$$

$\omega$ denotes the temporal frequency.

This pulse illuminates a ruled grating with a groove spacing $d_g$, which adds a linear phase to the temporal frequency spectrum of the incident pulse as follows:

$$\Psi_g(y, \omega) = \exp(ik\beta\omega y). \tag{S22}$$

$k=2\pi/\lambda$ is the wavenumber.

$$\beta = -\frac{m\lambda^2}{2\pi c d_g \cos\theta}$$

is the angular dispersion parameter of the grating, where m is the diffraction order and $\theta$ the diffraction angle. Fourier-transformed to the time domain, the pulse profile right after the grating is as follows:

$$E_g(y, \tau) = \exp\left\{-\left[\left(\frac{y}{y_i}\right)^2 + \left(\frac{t' - k\beta y}{\tau_i}\right)^2\right]\right\}. \tag{S23}$$

The t'-y coupling in Relation (S23) shows the PFT induced by the angular dispersion. Thus, an imaging system is used to recombine all the frequencies at the image plane. The pulse profile $E_n(y,t')$ can be expressed as follows:

$$E_o(y, t') = \exp\left\{-\left[\left(\frac{y}{My_i}\right)^2 + \left(\frac{t' - \frac{k\beta y}{M}}{\tau_i}\right)^2\right]\right\}, \tag{S24}$$

M is the magnification ratio. Relation (S24) shows that the generated pulse has a pulse width the same as the incident one. The tilt angle is tunable by both the diffraction grating and the magnification ratio of the imaging system. This front-titled pulse interacts with a typically moving object. With articulate control of the tilt angle to be compatible with the moving object's velocity, the object always coincides with the laser pulse, which allows probing its temporal information.

As people in the art will appreciate, PFT-gated ultrafast imaging and diffraction-gated real-time ultrahigh-speed mapping (DRUM) photography are different at least in the following aspects (FIG. 8A). First, in PFT, the linear phase is added in the temporal frequency domain. It can be directly accomplished by using an ordinary diffraction grating with a fixed blaze angle. In contrast, the linear phase in diffraction-gated real-time ultrahigh-speed mapping (DRUM) photography is added in the spatial frequency domain; a tunable blaze-angle grating is used as a time-dependent blazed angle, to achieve time-space coupling. Second, while temporal Fourier transformation is used in PFT generation, in diffraction-gated real-time ultrahigh-speed mapping (DRUM) photography, spatial Fourier transformation is implemented for coupling time to space in the sweeping diffraction envelope, optically using a Fourier lens to perform spatial Fourier transformation. Third, the PFT-based ultrafast imaging systems require a broadband ultrashort pulse, while diffraction-gated real-time ultrahigh-speed mapping photography uses a single-wavelength continuous-wave beam.

System Synchronization

The camera exposure was synchronized with the DMD's flipping motion. The camera's exposure time was set to 5 μs. For all the experiments involving the femtosecond laser (Huaray, HR-Femto 10 Series), the pump pulses were used as master triggers. In particular, these pump pulses had a repetition rate of 2.5 Hz. A piece of microscope cover glass was inserted in the optical path to reflect a small fraction of the energy of the pump pulse to a photodiode (PD). The output signal from the PD was sent to a delay generator (DG535, Stanford Research Systems), which reshaped it to a TTL signal. The output channels of this delay generator were used to synchronously control the DMD's flipping motion and the camera's exposure. The time delay between the pump pulse excitation and image acquisition can be tuned by changing the delay between the input and output channels of the delay generator.

Figure 9A:
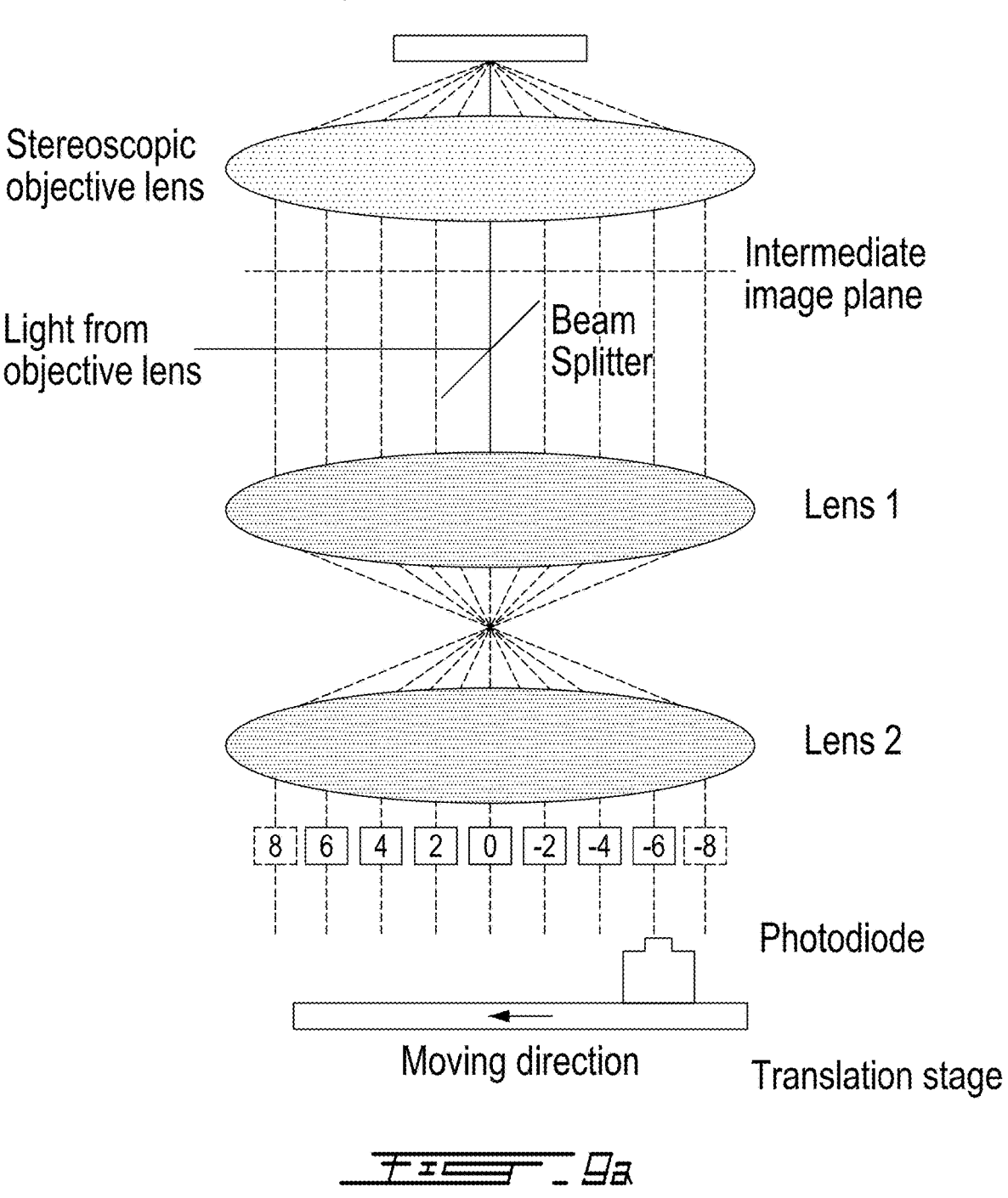
FIG. 9A is a schematic view of a system for the characterization.

Characterization of Diffraction-Gated Real-Time Ultrahigh-Speed Mapping Photography's Temporal Resolution To measure the frame rate and temporal resolution of diffraction-gated real-time ultrahigh-speed mapping photography, a PD was placed at the image plane, as shown in FIG. 9A. During the DMD's flipping operation, the PD recorded the time history of intensity at a specific location. Then, the PD was moved across the FOV with a step of 127 μm. The results are plotted in in FIG. 9B. The information on each diffraction order is summarized in Table 2, FIG. 8B. The measured location of each diffraction order well agrees with the calculated results using Relation (S14). The total time of sweeping across the seven diffraction orders is ~1.5 μs (FIG. 9C). The result also shows that the sweeping time difference between adjacent diffraction orders monotonically decreases from 0.23 μs to 0.17 μs. The frame interval between adjacent orders is $0.21 \pm 0.03$ μs (mean±standard deviation), which corresponds to a mean frame rate of $r_{DRUM}=4.8$ Mfps. The measured results were also compared to the simulation, both of which present acceleration of the micromirror's flipping motion. Finally, these curves were convolved with the time window of each frame. The temporal resolution, defined as the full width at half maximum of the convolution, was calculated to be $t_r=0.37\pm0.01$ μs.

Acousto-Optic Modulator (AOM) Alignment

In proof-of-concept experiments, an acousto-optic modulator (AOM, 97-02799-02, Gooch & Housego) was tilted to 88 degrees to achieve the highest diffraction efficiency of the first-order beam. The optical aperture had a size of 3 mm×3 mm. In the experiment of imaging intensity decay (see FIGS. 2C-2D), analog modulation of a sinusoidal function with a frequency of 35 kHz was used to adjust the intensity of the output laser beam. In the experiment to demonstrate the beam-sweeping across the FOV (see FIGS. 2E-2F), a ramp waveform ($V_{min}=2.79V$; $V_{max}=12.15$ V; 3-μs period) was set to control the diffraction angle of the incident laser beam.

Analysis of Laser-Induced Breakdown (LIB) in Oil

Figures 10A, 10B:
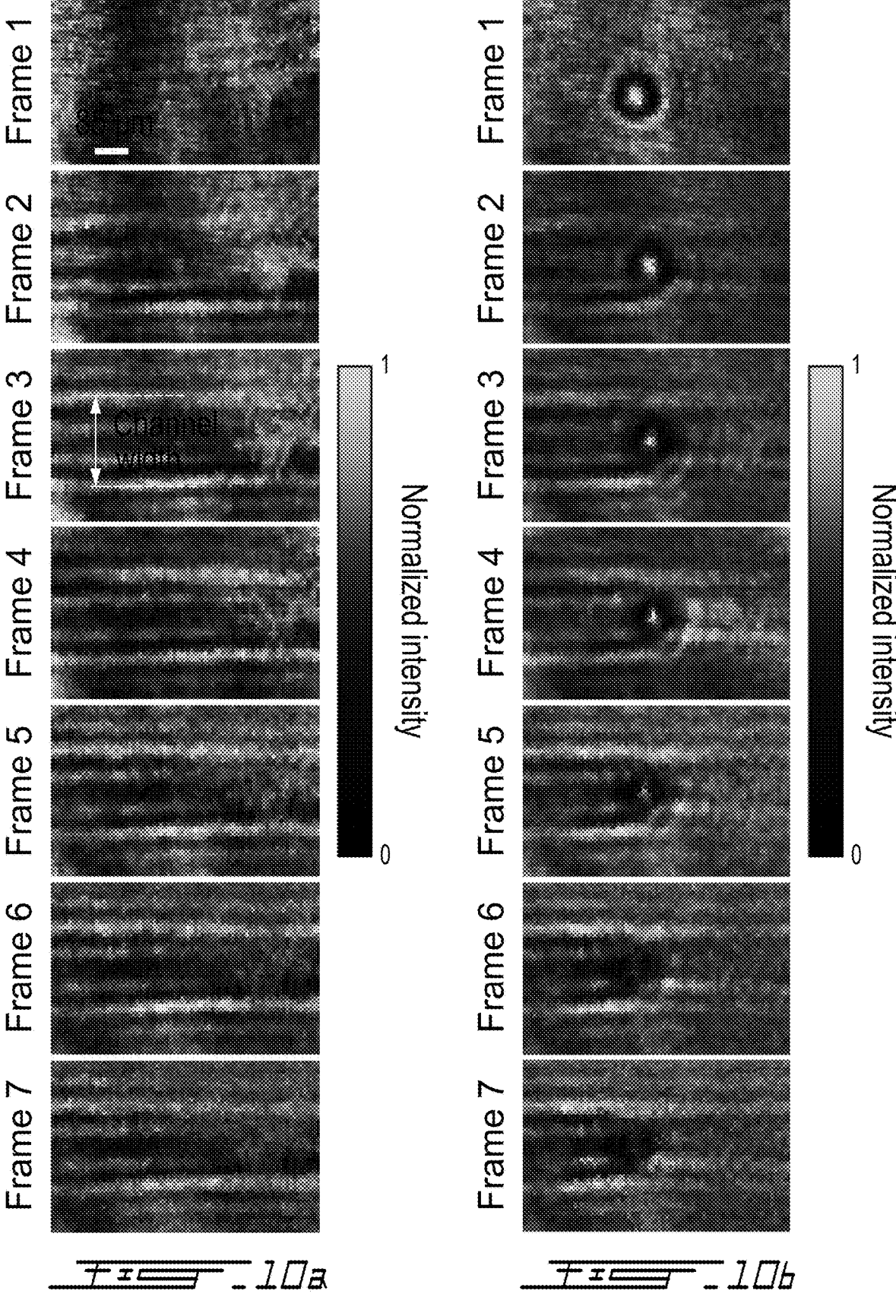
FIG. 10A shows the evolution of plasma channel generated by the femtosecond pump pulse via frames 7 to 1.
FIG. 10B shows evolution of plasma channel generated by the femtosecond pump pulse as in FIG. 10A, but perturbed by a previously generated bubble.

To investigate LIB in liquid with different refractive indices and viscosities, the distilled water was replaced with immersion oil (Thorlabs, OILCL30, refractive index $n_{oil}=1.5$, viscosity $\mu_{oil}=492$ mPas) and imaged the LIB phenomenon using the same experiment setup shown in FIG. 3A. The results, plotted in FIG. 10A, show the generation of the plasma channel with a width of $211\pm8$ μm, which is greater than the width, i.e., $112\pm4$ μm (FIG. 3B), generated in the distilled water (refractive index $n_{water}=1.3$, $\mu_{viscosity}=1$ mPas). This result was attributed to the higher refractive index of oil, which yielded a smaller refraction angle of the pump pulse in the cuvette. Moreover, channel distortion induced by previously generated bubbles were observed (FIG. 10B). In general, the bubble movement is governed by the buoyant force and the Stokes force. Since the oil is ~500× more viscous than the distilled water, the generated bubble by the previous pump pulse still dwelled in the FOV when the next pump pulse arrived. This floating bubble, which created a discontinuity in refractive index in the propagation of the focusing beam, perturbed plasma channel generation. Compared to the unperturbed plasma channel (FIG. 10A), the presence of the bubble reduced the width and intensity of the plasma channel (FIG. 10B).

The presently disclosed photography method and system use the DMD's inter-pattern transition for ultrahigh-speed imaging. The DMD is placed at the Fourier plane to maximize the FOV. The time-gated frames in all diffraction orders are captured by a 2D camera, as opposed to a single-pixel sensor. Finally, the object plane is conjugate with both the intermediate image plane and the image plane. Without any scattering optical components placed in the system, the time-gated images from all diffraction orders with high spatial resolution are captured.

The presently disclosed imaging system and method may be used for ultrahigh-speed imaging, with an imaging speed up to millions frames per second, in a range of applications, such as imaging/display, entertainment, biophysics and biomedicine for example, selecting a mass-produced DMD for producing the diffraction gate in absence of mechanical movement, resulting in a cost-efficient and stable system. The presently disclosed imaging method allows to spatially separate and temporal gate successive 2D images in the optical domain while satisfying the condition for image formation on the image sensor, and allows sensitive framing measurement of a single ordinary CMOS/CCD sensor by directing these sequential frames onto different areas. The high sensitivity of such sensors is herein combined with using a continuous-wave laser beam for probing, to achieve ultrahigh-speed imaging with low instantaneous intensity, thereby overcoming issues of occurrence of photodamage to the imaged object in contrast to when relying on ultrashort laser pulses that typically yield a high peak power and a short time duration, and may damage bio samples in in vivo applications, for example.

According to an embodiment of an aspect of the present disclosure, the system comprises a continuous-wave light source selected to generate a single-wavelength continuous-wave probing beam; a first imaging unit comprising a finite or infinite objective lens with NA of at least 0.1 and magnification ratio of up to 4× selected for magnifying the sample at the intermediate image plane according to the field of view at the object plane and the number of frames in a captured sequence, with a field of view 1-mm and sequence depth of seven in the experiment described hereinabove, and a beam splitter selected with a ratio different from 50% for deflecting the beam; a time gate comprising a folded 4f imaging system consisting of a stereoscopic objective lens and a DMD; a second imaging system such as a second 4f imaging system (see for example hereinabove Len 1 et Len 2) or other Fourier lens relay imaging system such as a 4f imaging system with different lenses and magnification ratio, selected for relaying the images to a sensor selected to record images, such as a CMOS or a CCD camera with working frame rate of at 1-10 frames per second, selected for recording the images; the flipping of the DMD and the exposure window of the CMOS camera being selected in combination.

According to an embodiment of an aspect of the present disclosure, the method comprises i) probing a transient scene at object plane; a beam expander or wave-shaping optical path may be used to accommodate the beam size and improve the beam quality; ii) imaging the probed transient scene onto an intermediate image plane using an objective lens with a magnification ratio selected according to the image field of view and sequence depth, such as a finite objective lens or an infinite objective lens; iii) applying diffraction-gating using a 4f imaging system, with a DMD as described herein or a micro-electromechanical system (MEM) device for example, placed at the Fourier plane of the intermediate image plane, selected to supply time gate; iv) rescaling the images size on the intermediate image plane onto the CMOS camera using a relay imaging system, or a low-speed CMOS or CCD camera; and v) synchronizing the flipping of the DMD with the exposure window of the CMOS camera; alternatively, a control software may be used for automated data acquisition.

The presently disclosed imaging method leverages programmable diffraction gating to accomplish ultrahigh imaging speed, i.e. imaging speeds up to millions frames per seconds. Based on space-time duality and PFT-gated ultrafast imaging, a linear phase ramp introduced by the flipping of DMD's micromirrors in the spatial frequency domain is used to enable time-space coupling at a sub-microsecond time scale without spatial overlapping and temporal cross-talk. The presently disclosed diffraction-gating method may be applied to a range of devices, such as for example a one-dimensional micro-electromechanical-system mirror array, to enhance energy efficiency. In addition, although demonstrated herein by using a 473-nm continuous-wave laser as the light source, the presently disclosed imaging method and system may be extended to other spectral regions.

The presently disclosed imaging method and system may be readily applied to biophysics. FIGS. 3D and 4B illustrate features of bubble cavitation as obtained for example, which provides experimental data to estimate the maximum radii reached by the bubbles. Besides the cavitation dynamics studied herein, modeling in biomedicine may thus provide insight into the maximum tissue displacement caused by the expansion of the laser plasma and the resulting macroscopic structural deformation. Thus, applications of the presently disclosed imaging method and system may include laser ablation lithotripsy, nano-surgeries, and laser-based cleaning methods.

The presently disclosed diffraction-gated real-time ultrahigh-speed mapping (DRUM) photography uses the DMD's inter-pattern transition for ultrahigh-speed imaging in diffraction-gated real-time ultrahigh-speed mapping photography, the diffraction-gated real-time ultrahigh-speed mapping is placed at the Fourier plane to maximize the field of view (FOV). The time-gated frames in all diffraction orders are captured by a 2D camera. The object plane is conjugate with the intermediate image plane and the image. Without scattering optical components placed in the system, diffraction-gated real-time ultrahigh-speed mapping photography assures capturing the time-gated images from all diffraction orders with high spatial resolution.

As people in the art will now be in a position to appreciate, in the presently disclosed imaging method, based on optical space-time duality, the spatial equivalence of the linear phase ramp is derived to that in the temporal frequency spectrum. This dynamic phase profile generates the linear space-time coupling in the diffraction envelope, which gates out successive temporal slices in adjacent diffraction orders. Optically embodying this method, single-shot diffraction-gated real-time ultrahigh-speed mapping photography allows capturing transient events in real time with an imaging speed of 4.8 million frames per second (Mfps). The feasibility of diffraction-gated real-time ultrahigh-speed mapping photography is demonstrated by imaging the dynamics of intensity decay and beam sweeping. To show diffraction-gated real-time ultrahigh-speed mapping photography's broad utility, it is applied to the study of femtosecond-pulse-induced bubble dynamics in liquid and the ablation of a biological sample at single-cell resolution.

The scope of the claims should not be limited by the embodiments set forth in the examples, but should be given the broadest interpretation consistent with the description as a whole.

The invention claimed is:

1. A high-speed imaging system, comprising:
   a continuous-wave light source;
   a first imaging unit;
   a second imaging unit;
   a time gate;
   a third imaging unit; and
   a sensor, synchronized with the time gate; wherein a single-wavelength probing beam from said light source is used to probe a transient scene, the first imaging unit collects the transient scene as probed by the probing beam and forms an image of the transient scene;
   the second imaging unit generates a first Fourier transformation; the time gate generates different replicated images of the transient scene at spatially separated positions as a sequence of images frames; and the third imaging unit relays the different replicated images to the sensor, for recording images of the transient.

2. The system of claim 1, wherein the time gate is a spatial light modulator positioned at the Fourier plane of the second imaging unit.

3. The system of claim 1, wherein the light source comprises a beam expander.

4. The system of claim 1, wherein the light source comprises a wave-shaping optical path.

5. The system of claim 1, wherein the first imaging unit has a magnification ratio selected according to a field of view and a sequence depth of the images, and an exposure window of the sensor is selected according to a flipping time of the time gate.

6. The system of claim 1, wherein the first imaging unit is one of a finite or infinite objective lens.

7. The system of claim 1, wherein third imaging system generates a second Fourier transformation.

8. The system of claim 1, wherein the second imaging unit comprises a first 4f system and the third imaging unit comprises a second 4f system.

9. The system of claim 1, wherein the time gate is one of digital micromirror devices, chips, micro-electromechanical systems chips, spatial light modulator crystals, and deformable mirrors.

10. The system of claim 1, wherein the first imaging unit forms the image of the transient scene, and the time gate generates the different replicated images of the transient scene at the spatially separated positions on an intermediate image plane; the third imaging system relays the different replicated images to the sensor at an image plane.

11. The system of claim 1, wherein the transient scene is located at an object plane, the first imaging unit comprises a lens selected for magnifying the transient scene at an intermediate image plane according to a field of view at the object plane and a number of frames in a captured sequence of the collected transient scene; the second imaging unit comprises a first 4f system, the time generates the sequence of images frames on the intermediate image plane, the third imaging unit comprises a second 4f system and relays the sequence of images frames to the sensor at an image plane, and the sensor is a 2D camera.

12. The system of claim 1, wherein the time gate is a spatial light modulator and the different replicated images of the transient scene at the spatially separated positions correspond to different diffraction orders generated by the spatial light modulator.

13. The system of claim 1, wherein the sensor is a 2D camera.

14. The system of claim 1, wherein the sensor is one of a CMOS and a CCD camera with a working frame rate of 1-10 frames per second selected according to the time gate.

15. A high-speed imaging method, comprising probing a transient scene using a single-wavelength continuous wave beam; collecting the transient scene as probed by the probing beam and forming an image of the transient scene; generating a first Fourier transformation, time-gating the image, thereby generating frames of the transient scene at spatially separated positions; relaying the time-gated frames of the transient scene to a sensor synchronized with said time-gating; and recording images.

16. The method of claim 15, comprising using a spatial light modulator for generating the time-gated frames of the transient scene at the spatially separated positions.

17. The method of claim 15, comprising magnifying the transient scene as probed by the beam onto an intermediate image plane; generating the time-gated frames of the transient scene at the spatially separated positions on the intermediate image plane; and relaying the time-gated frames of the transient scene to the sensor image plane for the recording.

18. The method of claim 15, comprising using a first Fourier system and a spatial light modulator to generate the time-gated frames of the transient scene at the spatially separated positions.

19. The method of claim 15, comprising using a first Fourier system and a spatial light modulator placed at the Fourier plane of the first 4f imaging system to generate the time-gated frames of the transient scene at the spatially separated positions.

20. The method of claim 15, comprising using a lens and a spatial light modulator, the lens being selected according to a flipping time of the spatial light modulator.

* * * * *